US011435928B2

(12) United States Patent
Ueshima et al.

(10) Patent No.: US 11,435,928 B2
(45) Date of Patent: Sep. 6, 2022

(54) CALCULATION PROCESSING APPARATUS AND INFORMATION PROCESSING SYSTEM

(71) Applicant: Sony Semiconductor Solutions Corporation, Kanagawa (JP)

(72) Inventors: Jun Ueshima, Tokyo (JP); Takahiro Okada, Saitama (JP); Tadaaki Yuba, Kanagawa (JP); Ken Matsumoto, Kanagawa (JP); Shinichi Tsuchida, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/474,384

(22) PCT Filed: Oct. 13, 2017

(86) PCT No.: PCT/JP2017/037113
§ 371 (c)(1),
(2) Date: Jun. 27, 2019

(87) PCT Pub. No.: WO2018/138975
PCT Pub. Date: Aug. 2, 2018

(65) Prior Publication Data
US 2019/0347030 A1    Nov. 14, 2019

(30) Foreign Application Priority Data
Jan. 26, 2017    (JP) .............................. JP2017-011862

(51) Int. Cl.
*G06F 3/06*    (2006.01)
*G06F 13/16*    (2006.01)
*G06F 13/40*    (2006.01)

(52) U.S. Cl.
CPC .......... *G06F 3/0647* (2013.01); *G06F 3/0604* (2013.01); *G06F 3/0659* (2013.01);
(Continued)

(58) Field of Classification Search
CPC .... G06F 3/0647; G06F 3/0604; G06F 3/0659; G06F 3/0673; G06F 13/1668; G06F 13/4022; G06F 13/28
See application file for complete search history.

(56) References Cited

U.S. PATENT DOCUMENTS 6,782,445 B1 *    8/2004    Olgiati ................. G06F 9/3879
710/35
7,546,441 B1 *    6/2009    Ansari ................. G06F 9/30181
712/220
(Continued)

FOREIGN PATENT DOCUMENTS

| JP | 2002-163239 A | 6/2002 |
| JP | 2003-216566 A | 7/2003 |
| JP | 2005-157717 A | 6/2005 |

*Primary Examiner* — Prasith Thammavong
*Assistant Examiner* — Richard L Sutton
(74) *Attorney, Agent, or Firm* — Michael Best & Friedrich LLP

(57) ABSTRACT

A calculation processing apparatus is disclosed. In one example, an exclusive memory stores an exclusive area different from an address space of a processor. A data transfer unit performs transfer processing of data items between the address space and the exclusive memory. A calculation processing unit performs calculation processing between the data items stored in the exclusive memory. A command resistor group holds each command of command columns received from the processor in each resistor. A state machine manages a state of processing in the data transfer unit and the calculation processing unit. A control unit controls the command resistor group so as to hold the command and controlling the command resistor group such that the commands held by the command resistor group are fed to any of the data transfer unit and the calculation processing unit depending on the state.

20 Claims, 15 Drawing Sheets

(52) U.S. Cl.
CPC ........ *G06F 3/0673* (2013.01); *G06F 13/1668* (2013.01); *G06F 13/4022* (2013.01)

(56) References Cited

U.S. PATENT DOCUMENTS

| | | | | |
|---|---|---|---|---|
| 7,627,723 | B1 * | 12/2009 | Buck | G06F 9/3001 |
| | | | | 711/155 |
| 7,788,470 | B1 * | 8/2010 | Purcell | G06F 9/3857 |
| | | | | 712/34 |
| 2002/0062352 | A1 * | 5/2002 | Asano | G06F 13/28 |
| | | | | 709/212 |
| 2007/0011360 | A1 * | 1/2007 | Chang | G06F 3/0659 |
| | | | | 710/5 |
| 2008/0301381 | A1 * | 12/2008 | Lee | G06F 13/28 |
| | | | | 711/154 |
| 2015/0012687 | A1 * | 1/2015 | Huang | G06F 3/0679 |
| | | | | 711/103 |
| 2017/0123729 | A1 * | 5/2017 | Watanabe | G06F 3/0604 |
| 2017/0235692 | A1 * | 8/2017 | Ahamed | G06F 1/3287 |
| | | | | 710/308 |
| 2018/0137060 | A1 * | 5/2018 | Park | G06F 3/0679 |
| 2019/0227742 | A1 * | 7/2019 | Singhal | G06F 3/0607 |
| 2020/0050393 | A1 * | 2/2020 | Patel | G11C 16/26 |

* cited by examiner

CALCULATION PROCESSING APPARATUS AND INFORMATION PROCESSING SYSTEM

TECHNICAL FIELD

The present technology relates to a calculation processing apparatus and, more particularly to, a calculation processing apparatus providing a calculation function outside a processor and an information processing system including the calculation processing apparatus.

BACKGROUND ART

As a technique for reducing a load of a processor, there is known a technology that realizes a part of calculation functions by using a calculation processing apparatus outside the processor. The calculation processing apparatus is generally referred to as a coprocessor. Application ranges of the calculation processing apparatus are wide including floating-point calculation, an FFT, and the like. The calculation processing apparatus has a dedicated memory area inside. Between a common storage device to which both of the processor and the calculation processing apparatus can access and the dedicated memory area of the calculation processing apparatus, data items are exchanged by a DMA (Direct Memory Access) transfer.

In the DMA transfer, in a case where the data items to be transferred distribute into a plurality of areas, it needs to perform controlling of designating an address multiple times to a DMA transfer unit from a processor. Generally, the control is performed such that the processor receives interrupt notification of a transfer end of the DMA transfer and gives necessary control data to the DMA transfer unit as appropriate. Since DMA interrupt notification processing frequently occurs, a processor load is not light, which may decrease a utilization efficiency of the processor. In addition, the DMA interrupt notification requires the processor to instruct the next operation of the DMA transfer. Accordingly, in a case where the processor performs other higher priority processing and cannot instruct processing contents to the DMA transfer unit with respect to a DMA interrupt request, the DMA transfer unit waits the instruction of the processing contents and the DMA transfer efficiency is decreased.

Therefore, it has been proposed that a command buffer for storing control contents (commands) is provided between the processor and the DMA transfer unit (see Patent Literature 1, for example). Specifically, the processor writes a plurality of control contents determined in advance into the command buffer and the command buffer immediately feeds the processing contents to the DMA transfer unit upon the interrupt notification from the DMA transfer unit. If the command buffer is prepared, the command buffer can continuously feed the processing contents to the DMA transfer unit. Therefore, when the processor includes no other items to be preferentially processed, the control contents may be stored together in the command buffer. In this manner, a decrease in the DMA transfer efficiency can be avoided.

CITATION LIST

Patent Literature

Patent Literature 1: Japanese Patent Application Laid-open No. 2005-157717

DISCLOSURE OF INVENTION

Technical Problem

In the above-described background art, by providing the command buffer, necessary processing contents can be fed to the DMA transfer unit upon the interrupt notification from the DMA transfer unit. However, in a case where the calculation processing apparatus outside the processor calculates, it needs to successively perform controls following procedures such as data transfer needed for calculation, calculation processing, and transfer of calculation result data. If the processor directly performs this series of controls by interruption, a heavy load will be applied to the processor. In a case where the processor performs other higher priority processing and cannot instruct processing contents to the calculation processing apparatus with respect to an interruption request of the calculation processing apparatus, the calculation processing apparatus waits the instruction of the processing contents. Thus, a data transfer efficiency between an address space of the processor and an exclusive memory of the calculation processing apparatus is decreased. Therefore, if an improvement in the DMA transfer unit is extended and the control by the command buffer is exerted over the whole of the calculation processing apparatus, the command buffer needs to successively control different functions. For example, the command buffer needs to successively control the different functions of the DMA transfer unit and a calculation apparatus in the calculation processing apparatus following procedures such as data transfer, calculation, and transfer of calculation result data in order to calculate by the calculation processing apparatus outside the processor. Therefore, the command buffer should always know a progress status of the calculation performed by the calculation processing apparatus and control respective functions of the calculation processing apparatus as necessary. On the other hand, in order to know contents of the calculation performed by the calculation processing apparatus by the command buffer, it needs to accurately interpret the control contents by the command buffer and provide a decoder or the like for the control contents inside the command buffer, which may results in a complex configuration of the command buffer.

The present technology is made in view of the above-mentioned circumstances, and it is an object of the present technology to improve a data transfer efficiency between an address space of a processor and an exclusive memory of a calculation processing apparatus with a simple configuration.

Solution to Problem

The present technology is made in order to solve the above-described problems. A first aspect is a calculation processing apparatus, including: an exclusive memory storing an exclusive area different from an address space of a processor; a data transfer unit performing transfer processing of data items between the address space and the exclusive memory; a calculation processing unit performing calculation processing between the data items stored in the exclusive memory; a command register group holding each command of command columns received from the processor in each register; a state machine managing a state of processing in the data transfer unit and the calculation processing unit; and a control unit controlling the command register group so as to hold the command and controlling the command register group such that the commands held by the command register group are fed to any of the data transfer unit and the calculation processing unit depending on the state. According to the first aspect, the state machine manages the state of processing in the data transfer unit and the calculation processing unit and a data transfer efficiency is advantageously improved.

In addition, in the first aspect, the state machine may cause the state to be shifted in accordance with a predetermined number of commands corresponding to the command columns to manage the state. According to the first aspect, the state is advantageously managed by a simple method based on the number of commands.

In addition, in the first aspect, the command column may include a command of performing first data transfer processing of transferring the data items from the address space to the exclusive memory, a command of performing calculation processing between the data items stored in the exclusive memory, and a command of performing second data transfer processing of transferring the data items from the exclusive memory to the address space, the state machine may cause the state to shift to a state of allowing execution of the command of performing the first data transfer processing when the command of performing the first data transfer processing is inputted, cause the state to shift to a state of allowing execution of the command of performing the calculation processing when a time necessary to execute the command of performing the first data transfer processing elapses, and cause the state to shift a state of allowing execution of the command of performing the second data transfer processing when a time necessary to execute the command of performing the calculation processing elapses. According to the first aspect, the state is advantageously managed by a simple method based on elapsed time.

In addition, in the first aspect, the command register group may include a plurality of sub-register groups, and the control unit may control such that the different command columns are held by the respective plurality of sub-register groups when the plurality of the command columns is received from the processor. According to the first aspect, writing and reading-out commands into/from command register group in a parallel way are advantageously available.

In addition, in the first aspect, the control unit may control such that the commands of the different command columns are exclusively fed to the data transfer unit and the calculation processing unit. According to the first aspect, processing is advantageously executed exclusively in the data transfer unit and the calculation processing unit.

In addition, in the first aspect, the state machine may manage the states specific to the respective different command columns. According to the first aspect, it advantageously allows to operate in a state specific to each command column.

In addition, in the first aspect, the state machine may shift the state of one of the plurality of command columns in accordance with the predetermined number of commands corresponding to the one of the plurality of command columns when the states of the plurality of command columns are managed and in accordance with the states of other command columns. According to the first aspect, it advantageously allows to operate taking the states of the other command columns into consideration.

In addition, in the first aspect, each of the plurality of command columns may include a command of performing first data transfer processing of transferring the data items from the address space to the exclusive memory, a command of performing calculation processing between the data items stored in the exclusive memory, and a command of performing second data transfer processing of transferring the data items from the exclusive memory to the address space, the state machine may cause the state to shift a state of allowing execution of the command of performing the first data transfer processing on a command column to be second processed of the plurality of the command columns when the time necessary to execute the command of performing the first data transfer processing of a command column to be first processed of the plurality of the command columns elapses, cause the state to shift a state of allowing execution of a command of performing the calculation processing on the command column to be second processed of the plurality of the command columns when the time necessary to execute the command of performing the calculation processing of the command column to be first processed elapses, and cause the state to shift a state of allowing execution of a command of performing the second data transfer processing on the command column to be first processed when the time necessary to execute the command of performing the calculation processing of the command column to be first processed elapses. According to the first aspect, the state is advantageously managed by a simple method based on elapsed times necessary to execute the command of performing the first data transfer processing and necessary to execute the command of performing the calculation processing.

In addition, in the first aspect, the state machine may cause the state to shift a state of allowing execution of the command of performing the calculation processing on the command column to be second processed when the time necessary to execute the command of performing the calculation processing of the command column to be first processed elapses or when the state is shifted to the state that the command of performing the calculation processing on the command column to be first processed is ended. According to the first aspect, it advantageously allows to operate taking the states of the other command columns into consideration.

Furthermore, a second aspect of the present technology is an information processing system, including: a processor; a calculation processing apparatus; and a shared memory storing an address space of the processor and being accessible even from the calculation processing apparatus, the calculation processing apparatus including an exclusive memory storing an exclusive area different from an address space of a processor, a data transfer unit performing transfer processing of data items between the address space and the exclusive memory, a calculation processing unit performing calculation processing between the data items stored in the exclusive memory, a command register group holding each command of command columns received from the processor in each register, a state machine managing a state of processing in the data transfer unit and the calculation processing unit, and a control unit controlling the command register group so as to hold the command and controlling the command register group such that the commands held by the command register group are fed to any of the data transfer unit and the calculation processing unit depending on the state. According to the second aspect, the state machine manages the state of processing in the data transfer unit and the calculation processing unit and a data transfer efficiency between the processor and the calculation processing apparatus is advantageously improved.

Advantageous Effects of Invention

The present technology can provide an advantage that a data transfer efficiency between an address space of a processor and an exclusive memory of a calculation processing apparatus is improved with a simple configuration. It should be noted that the effects described here are not necessarily limitative and may be any of effects described in the present disclosure.

MODE(S) FOR CARRYING OUT THE INVENTION

Hereinafter, modes for carrying out the present technology (hereinafter, referred to as embodiments) will be described. Description will be given in the following order.
1. First embodiment (example of control by one state machine)
2. Second embodiment (example of control by two state machines)
3. Third embodiment (example of allowing parallel processing calculation processing and calculation result output)

1. First Embodiment

Figure 1:
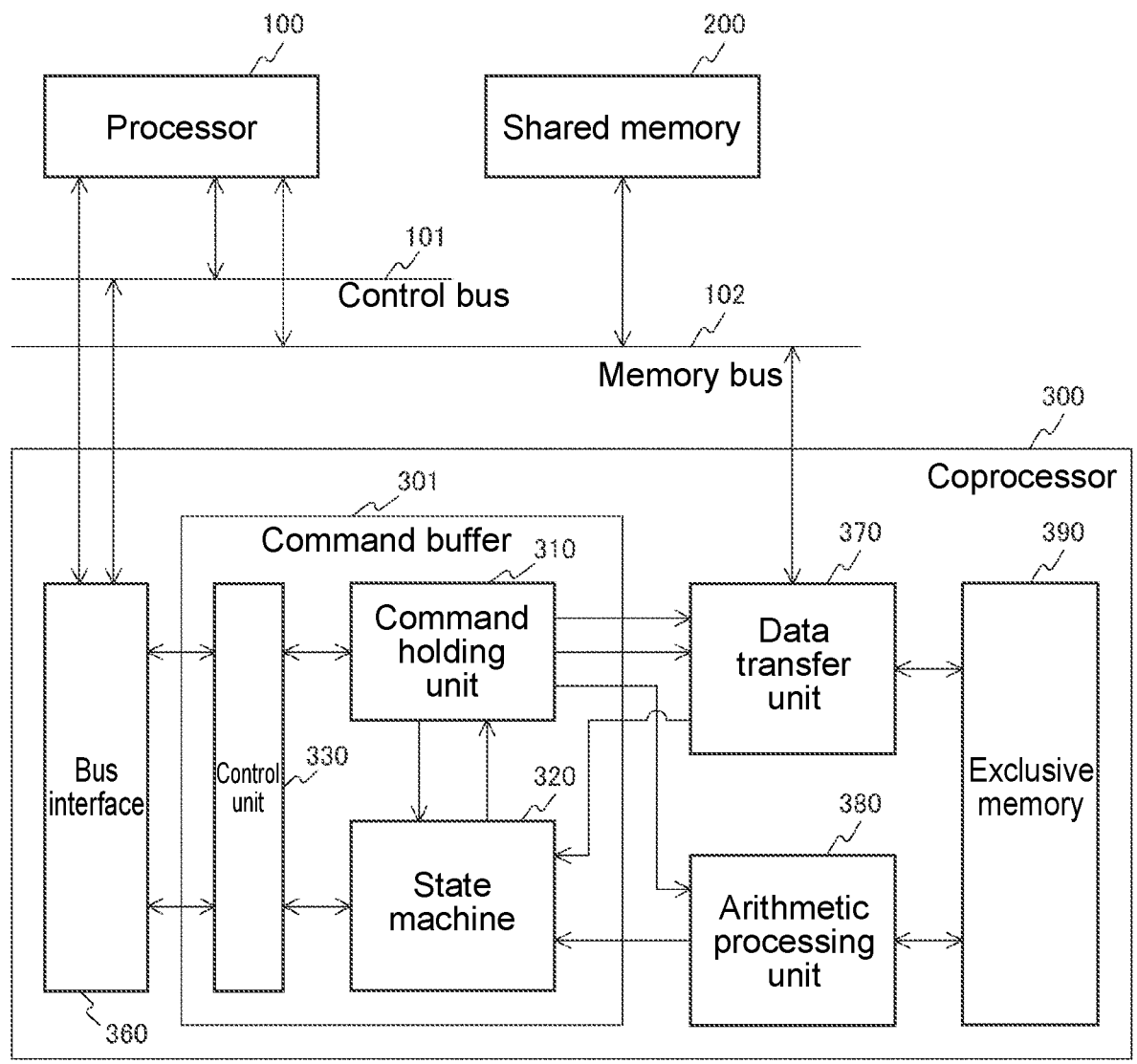
FIG. 1 is a diagram showing a configuration example of an information processing system in an embodiment of the present technology.

[Information processing system configuration] FIG. 1 is a diagram showing a configuration example of an information processing system in an embodiment of the present technology. The information processing system includes a processor 100, a shared memory 200, and a coprocessor 300. These are interconnected a control bus 101 and a memory bus 102.

The processor 100 is an apparatus of performing entire processing of the information processing system. The coprocessor 300 is an calculation processing apparatus that performs predetermined calculation processing by following instructions from the processor 100. The shared memory 200 is a memory of storing an address space of the processor 100. Both of the processor 100 and the coprocessor 300 can have access to the shared memory 200. Note that the coprocessor 300 is an example of the calculation processing apparatus as claimed in the claims.

The coprocessor 300 includes a command buffer 301, a bus interface 360, a data transfer unit 370, an calculation processing unit 380, and an exclusive memory 390. The command buffer 301 includes a command holding unit 310, a state machine 320, and a control unit 330.

The command buffer 301 includes a command holding unit 310 that holds dedicated control instructions (commands). The commands are written into the command holding unit 310 from the processor 100 via the control bus 101.

The state machine 320 manages a state of processing in the data transfer unit 370 and the calculation processing unit 380.

The command holding unit 310 holds each command of each command column received from the processor 100. The command holding unit 310 holds each command by following the control by the control unit 330.

The control unit 330 controls the command holding unit 310. The control unit 330 controls the command holding unit 310 so as to hold each command of each command column received from the processor 100. In addition, the control unit 330 controls the command holding unit 310 such that the commands held by the command holding unit 310 are fed to any of the data transfer unit 370 and the calculation processing unit 380 depending on the state managed by the state machine 320.

The bus interface 360 is an interface between the control bus 101 and the command buffer 301. The processor 100 and the command buffer 301 in the coprocessor 300 are connected via the control bus 101.

The exclusive memory 390 is a memory that stores an exclusive area different from the address space of the processor 100.

The calculation processing unit 380 performs calculation processing between data items stored in the exclusive memory 390.

The data transfer unit 370 performs data transfer processing between the address space of the processor 100 and the exclusive memory 390. In a case where the data transfer unit 370 performs data transfer processing, DMA (Direct Memory Access) transfer is performed between the shared memory 200 and the exclusive memory 390. Accordingly, at the time of the DMA transfer, a start address, an amount of transferred data, and the like are set to the data transfer unit 370. The data transfer unit 370, the processor 100, and the shared memory 200 are connected via the memory bus 102.

The data transfer unit 370 and the calculation processing unit 380 are connected to the exclusive memory 390. Each of the data transfer unit 370 and the calculation processing unit 380 can execute access to, i.e., read-out from and write-into, the exclusive memory 390.

Figure 2:
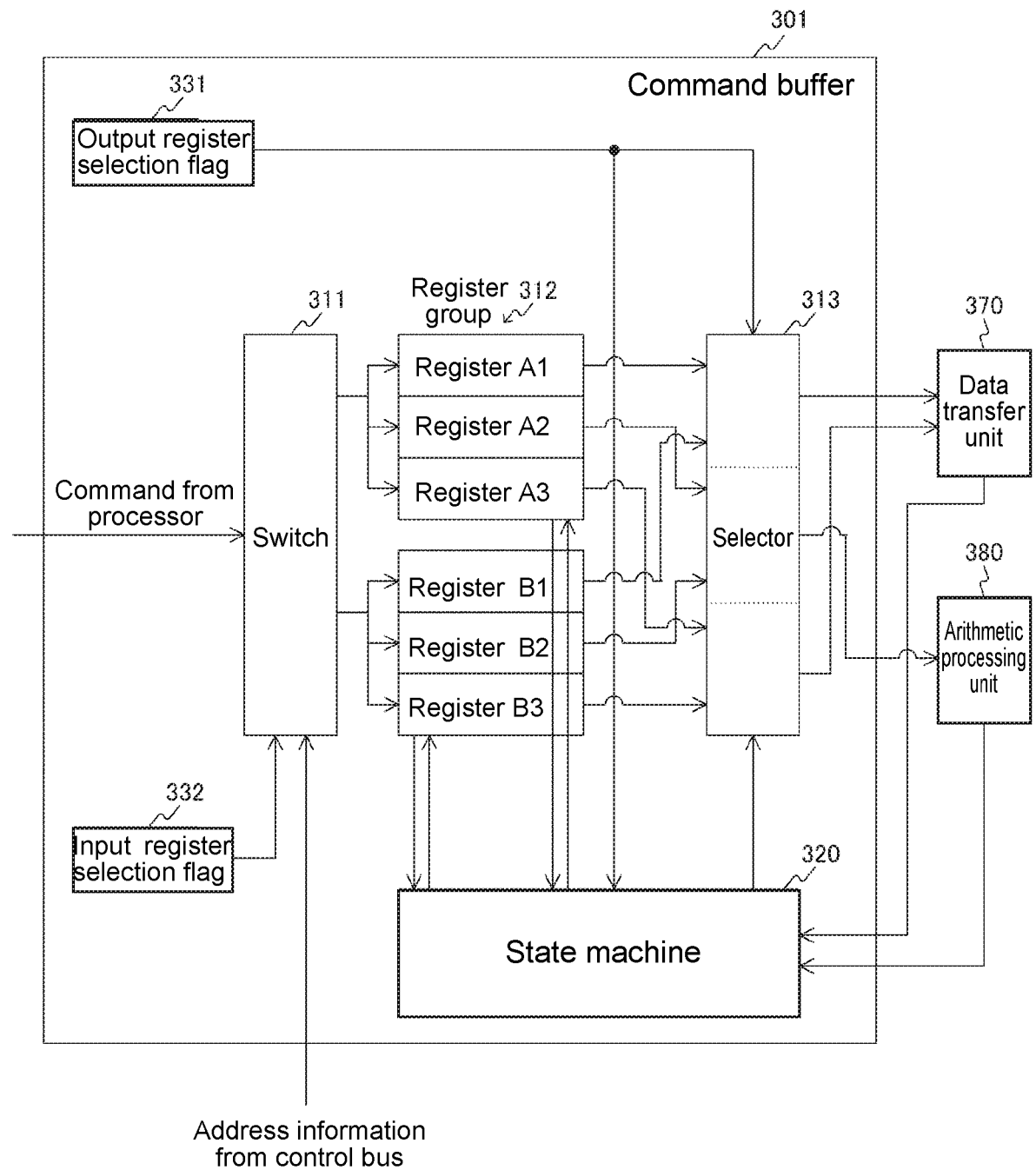
FIG. 2 is a diagram showing a configuration example of a command buffer 301 in the first embodiment of the present technology.

FIG. 2 is a diagram showing a configuration example of the command buffer 301 in the first embodiment of the present technology. The command buffer 301 includes a register group 312, a switch 311, a selector 313, the state machine 320, an output register selection flag 331, and an input register selection flag 332.

The register group 312 includes each register that holds each command of each command column received from the processor 100. In this example, the register group 312 includes registers A1 to A3 and B1 to B3. The register A1 and the register B1 are registers that hold commands to the data transfer unit 370 at the time of writing data items of the shared memory 200 into the exclusive memory 390. The register A2 and the register B2 are registers that hold commands of the calculation processing unit 380. The register A3 and the register B3 are registers that hold commands to the data transfer unit 370 at the time of writing data items of the exclusive memory 390 into the shared memory 200. Each of these registers A1 to A3 and B1 to B3 has a FIFO (First-In First-Out) function that can store a plurality of commands and read-out the commands in a stored order. Note that the register group 312 is an example of the command register group as claimed in the claims.

The register group 312 recognizes the registers A1 to A3 and the registers B1 to B3 as sub-register group and controls such that different command columns are held for each of the sub-register group. Specifically, the first sub-register group, i.e., the registers A1 to A3 hold the first command column, and the second sub-register group, i.e., the registers B1 to B3 hold the second command column.

The switch 311 is a switch for distributing the commands from the processor 100 to any of the registers A1 to A3 and B1 to B3. The switch 311 decides to input the commands to either the registers A1 to A3 or B1 to B3 in accordance with the input register selection flag 332. In addition, the switch 311 decides to address selection of any of the registers A1 to A3 or any of the registers B1 to B3 in accordance with the address information from the control bus 101.

The selector 313 is a selector that selects outputs of any of the registers A1 to A3 and B1 to B3 and feeds the outputs to the data transfer unit 370 or the calculation processing unit 380. The outputs of the registers A1, A3, B1 and B3 are fed to the data transfer unit 370. The outputs of the registers A2 and B2 are fed to the calculation processing unit 380. The selector 313 decides to output the commands from either the registers A1 to A3 or B1 to B3 in accordance with the output register selection flag 331.

The state machine 320 is a state machine that manages the states of processing in the data transfer unit 370 and the calculation processing unit 380. A shift of the state managed by the state machine 320 will be described later.

The output register selection flag 331 is a flag by which the selector 313 selects to output the commands from either the registers A1 to A3 or B1 to B3 to the data transfer unit 370 and calculation processing unit 380.

The input register selection flag 332 is a flag by which the switch 311 decides to input the commands to either the registers A1 to A3 or B1 to B3.

Figure 3:
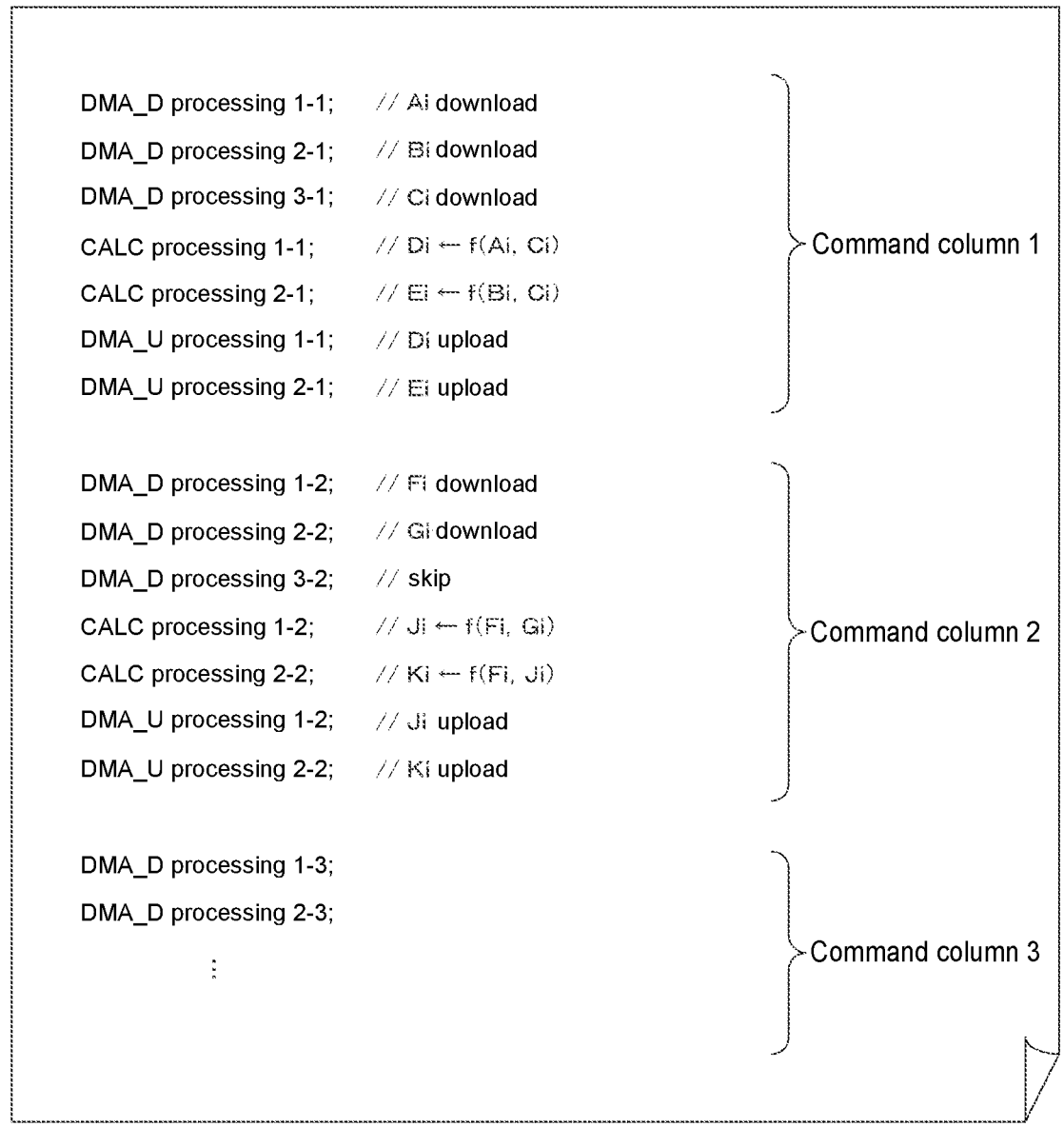
FIG. 3 is a diagram showing an example of the command columns in the embodiment of the present technology.

FIG. 3 is a diagram showing an example of the command columns in the embodiment of the present technology. In this example, two command columns of command columns 1 and 2 are assumed. Note that the command column 1 is an example of the command column to be first processed as claimed in the claims and the command column 2 is an example of the command column to be second processed as claimed in the claims.

In the command column 1, processing of copying (downloading) data columns Ai, Bi, Ci (i=0, 1, 2, . . . , n, and so on) necessary for performing calculation from the shared memory 200 to the exclusive memory 390 (DMA_D processing) is assumed. Hereinafter, processing of transferring the data column Ai is referred to as DMA_D processing 1-1, processing of transferring the data column Bi is referred to as DMA_D processing 2-1, and processing of transferring the data column Ci is referred to as DMA_D processing 3-1. Note that the DMA_D processing is an example of the first data transfer processing as claimed in the claims.

In addition, calculation processing (CALC processing) is performed on the data column prepared in the exclusive memory 390 and processing of writing the calculation result into the exclusive memory 390 is assumed. With respect to Ai and Ci, processing of Di=f (Ai, Ci) is performed. Processing the data column Di into the exclusive memory 390 is referred to as CALC processing 1-1. With respect to Bi and Ci, processing of Ei=f (Bi, Ci) is performed. Processing the data column Ei into the exclusive memory 390 is referred to as CALC processing 2-1.

Further, processing of copying (uploading) the calculation result from the exclusive memory 390 to the shared memory 200 (DMA U processing) is assumed. Processing of copying the data column Di from the exclusive memory 390 to the shared memory 200 is referred to as DMA U processing 1-1. Processing of copying the data column Ei from the exclusive memory 390 to the shared memory 200 is referred to as DMA U processing 2-1. Note that the DMA U processing is an example of the second data transfer processing as claimed in the claims.

Processing details of the coprocessor 300 in the command column 1 are obtaining the data columns Di and Ei of the calculation result from the data columns Ai, Bi, and Ci.

In the command column 2, processing of copying (downloading) data columns Fi and Gi necessary for performing calculation from the shared memory 200 to the exclusive memory 390 (DMA_D processing) is assumed. Hereinafter, processing of transferring the data column Fi is referred to as DMA_D processing 1-2 and processing of transferring the data column Gi is referred to as DMA_D processing 2-2. Note that as DMA_D processing 2-3, since there is no data column to be transferred, the processing is skipped without doing anything.

In addition, calculation processing (CALC processing) is performed on the data column prepared in the exclusive memory 390 and writing the calculation result into the exclusive memory 390 is assumed. With respect to Fi and Gi, processing of Ji=f (Fi, Gi) is performed. Writing the data column Ji into the exclusive memory 390 is referred to as CALC processing 1-2. With respect to Fi and Ji, processing of Ki=f (Fi, Ji) is performed. Writing the data column Ki into the exclusive memory 390 is referred to as CALC processing 2-2.

Further, processing of copying (uploading) the calculation result from the exclusive memory 390 to the shared memory 200 (DMA U processing) is assumed. Processing of copying the data column Ji from the exclusive memory 390 to the shared memory 200 is referred to as DMA U processing 1-2.

Processing of copying the data column Ki from the exclusive memory 390 to the shared memory 200 is referred to as DMA U processing 2-2.

Processing details of the coprocessor 300 in the command column 2 are obtaining the data columns Ji and Ki of the calculation result from the data columns Fi and Gi.

Figure 4:
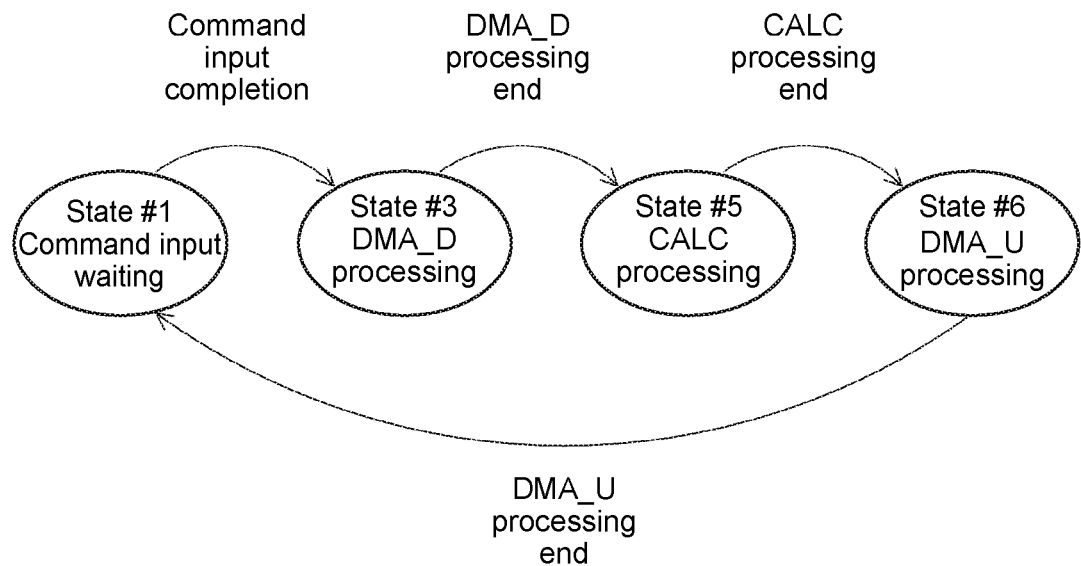
FIG. 4 is a diagram showing a shift example in the state managed by a state machine 320 in the first embodiment of the present technology.

FIG. 4 is a diagram showing a shift example in the state managed by the state machine 320 in the first embodiment of the present technology. In the first embodiment, the state managed by the state machine 320 is any one of four states; states #1, #3, #5, and #6.

The state #1 is a state that the register group 312 holds no commands and it waits for the commands to be inputted from the processor 100. In the state #1, when the commands (for example, command column 1 in FIG. 3) are inputted from the processor 100, it shifts to the next state #3.

The state #3 is a state that the data transfer unit 370 is DMA transferring (DMA_D processing) the data items from the shared memory 200 to the exclusive memory 390. In the state #3, after the data transfer is ended from the shared memory 200 to the exclusive memory 390, it shifts to the next state #5.

The state #5 is a state that the calculation processing unit 380 calculates (CALC processing) the data items transferred to the exclusive memory 390. In the state #5, when the calculation by the calculation processing unit 380 is ended, it shifts to the next state #6.

The state #6 is a state that the data transfer unit 370 DMA transfers (DMA U processing) the data items from the exclusive memory 390 to the shared memory 200. In the state #6, when the transfer of the data items from the exclusive memory 390 to the shared memory 200 is ended, it shifts to the first state #1.

In the state shifts, there can be used any of a method of shifting after waiting notification of the end of the processing from each functional block and a method of automatically performing next processing after waiting for a certain period of time.

Hereinafter, the former is assumed. Concerning each processing of the DMA_D processing, the CALC processing, and the DMA U processing, the number of commands necessary for each processing is determined in advance. Thus, the state machine 320 can shift the state without performing decode processing of each command. For example, in the state #3, when the time necessary to execute the command of performing the DMA_D processing elapses, the state machine 320 causes the state to shift to the state #5 of allowing execution of the command of performing the CALC processing. In addition, when the time necessary to execute the command of performing the CALC processing elapses, the state machine 320 causes the state to shift to the state #6 of allowing execution of the command of performing the DMA U processing.

Figure 5:
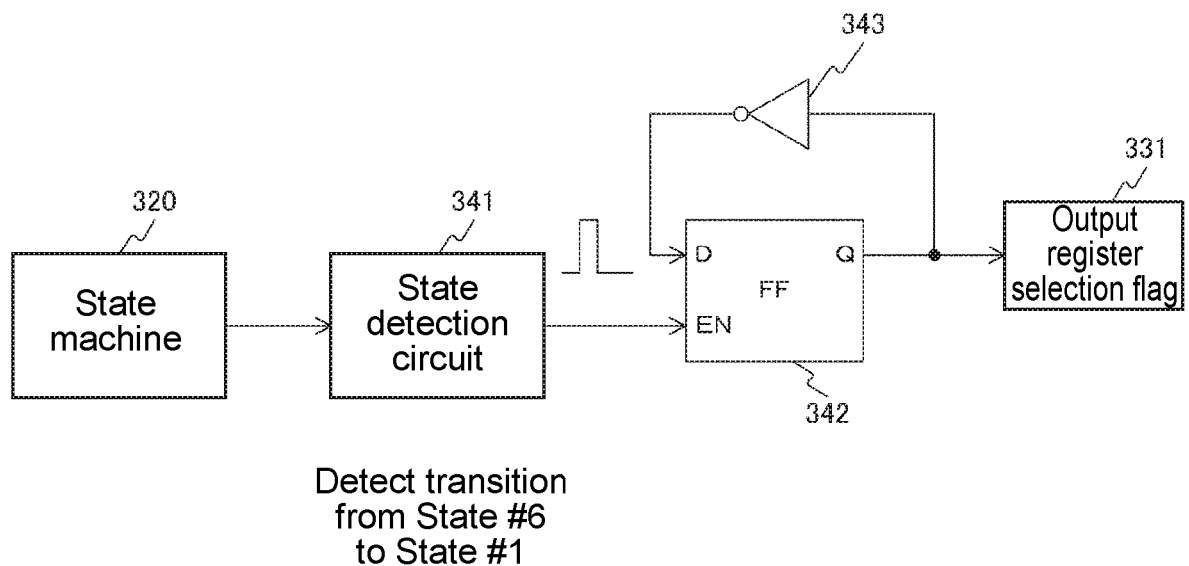
FIG. 5 is a diagram showing an example of control of an output register selection flag 331 in the first embodiment of the present technology.

FIG. 5 is a diagram showing an example of control of the output register selection flag 331 in the first embodiment of the present technology.

The state detection circuit 341 is a circuit that monitors the state shift in the state machine 320. When the state detection circuit 341 detects the shift from the state #6 to the state #1, the state detection circuit 341 outputs a pulse representing an effective signal to an effective terminal EN of the flip-flop 342.

The flip-flop 342 is flip-flop that holds any of "0" or "1". An output terminal Q of the flip-flop 342 is connected to an input terminal D via the inverter 343. Each time the pulse is inputted to the effective terminal EN, a held content is inverted.

The output register selection flag 331 holds a value of the output terminal Q of the flip-flop 342. Accordingly, the content of the output register selection flag 331 is to be inverted each time the state of the state machine 320 shifts from the state #6 to the state #1. Specifically, outputting the commands to the data transfer unit 370 and the calculation processing unit 380 from either the registers A1 to A3 or B1 to B3 is changed and alternately selected each time the state of the state machine 320 shifts from the state #6 to the state #1.

Figure 6:
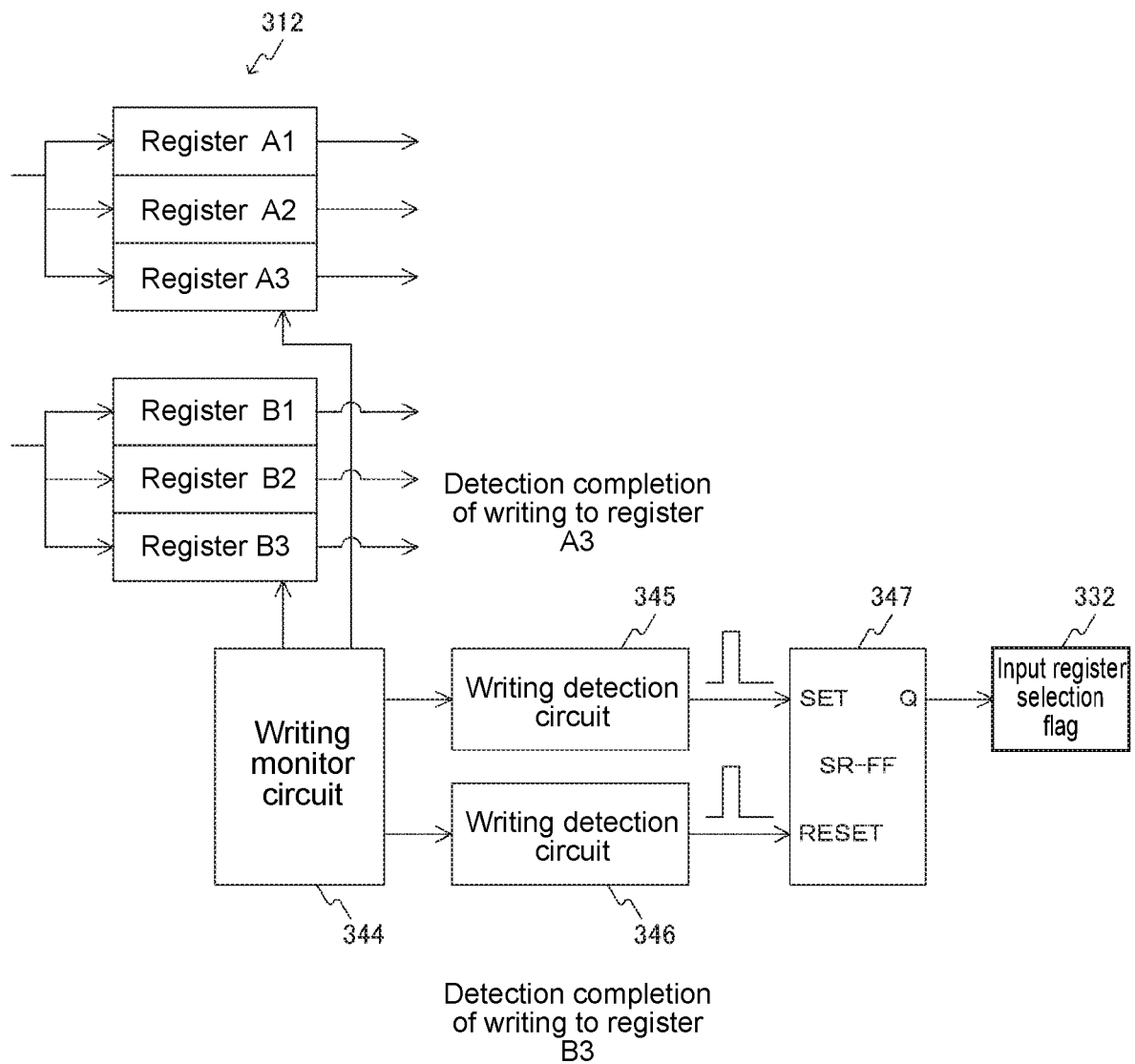
FIG. 6 is a diagram showing an example of control of an input register selection flag 332 in the embodiment of the present technology.

FIG. 6 is a diagram showing an example of control of the input register selection flag 332 in the embodiment of the present technology.

The writing monitor circuit 344 is a circuit that monitors completion of writing into the registers A1 to A3 and B1 to B3. A writing detection circuit 345 is a circuit that detects the completion of writing into the register A3. A writing detection circuit 346 is a circuit that detects the completion of writing into the register B3. An SR flip-flop 347 is flip-flop that holds any of "0" or "1".

When the writing detection circuit 345 detects the completion of writing into the register A3, the writing detection circuit 345 outputs a pulse representing a set signal to a set terminal SET of the SR flip-flop 347. With the set signal, the SR flip-flop 347 holds "1". On the other hand, when the writing detection circuit 346 detects the completion of writing into the register B3, the writing detection circuit 346 outputs a pulse representing a reset signal to a reset terminal RESET of the SR flip-flop 347. With the reset signal, the SR flip-flop 347 holds "0". Note that upon the detection by the writing detection circuits 345 and 346, a flag, for example, of the starting processing may be prepared in a command itself, or the state machine 320 itself may include a register and the processor 100 may write thereinto. Hereinafter, it is assumed that the command includes the register showing that the writing is ended and the command is executable.

The input register selection flag 332 holds a value of an output terminal Q of the flip-flop 347. Accordingly, the content of the input register selection flag 332 is to be inverted each time writing into the register A3 or B3 is completed. Specifically, inputting the command to either the registers A1 to A3 or B1 to B3 is changed each time the writing into the register A3 or B3 is completed and is alternately selected.

By the control of the output register selection flag 331 and the input register selection flag 332, writing and reading-out the commands into/from the registers A1 to A3 and B1 to B3 can be independently switched.

[Operation of Information Processing System]

Here, by assuming the above-described command columns, operation of the information processing system will be described. First, the processor 100 writes the commands necessary for the DMA_D processing 1-1 to 3-1 of the command column 1 into the register group 312 via the control bus 101. At this time, both initial values of the output register selection flag 331 and the input register selection flag 332 are "0".

The commands necessary for the DMA_D processing 1-1 to 3-1 are inputted into the switch 311. The switch 311 can know that the input commands are necessary for the DMA_D processing 1-1 to 3-1, for example, in accordance with the address information from the control bus 101. Here, since the value of the input register selection flag 332 is "0", the commands necessary for the DMA_D processing 1-1 to 3-1 are written into the register A1.

In addition, the processor 100 writes the commands necessary for the CALC processing 1-1 and 2-1 into the register group 312 via the control bus 101. At this time, since the value of the input register selection flag 332 is "0", the commands necessary for the CALC processing 1-1 and 2-1 are written into the register A2.

Furthermore, the processor 100 writes the commands necessary for the DMA U processing 1-1 and 2-1 into the register group 312 via the control bus 101. At this time, since the value of the input register selection flag 332 is "0", the commands necessary for the DMA U processing 1-1 and 2-1 are written into the register A3.

Note that the processor 100 instructs to write the commands into the register group 312 but does not need to know the register of the register group 312 into which the commands are written. In other words, the processor 100 recognizes the register group 312 as a kind of a FIFO memory.

When the commands necessary for the last DMA U processing 2-1 of the command column 1 are written into the register A3, the input register selection flag 332 is inverted from "0" to "1".

In a case where there is other command column 2 to be continuously processed, the processor 100 writes the commands necessary for the next DMA_D processing 1-2 to 3-2 into the register group 312 via the control bus 101. Since the input register selection flag 332 is "1", the switch 311 controls such that the commands necessary for the DMA_D processing 1-2 to 3-2 are written into the register B1.

In addition, the processor 100 writes the commands necessary for the CALC processing 1-2 and 2-2 into the register group 312 via the control bus 101. At this time, since the value of the input register selection flag 332 is "1", the commands necessary for the CALC processing 1-2 and 2-2 are written into the register B2.

Furthermore, the processor 100 writes the commands necessary for the DMA U processing 1-2 and 2-2 into the register group 312 via the control bus 101. At this time, since the value of the input register selection flag 332 is "1", the commands necessary for the DMA U processing 1-2 and 2-2 are written into the register B3.

When the commands necessary for the last DMA U processing 2-2 of the command column 2 is written into the register B3, the input register selection flag 332 is inverted from "1" to "0".

Next, the state shift in relation to the command column 1 will be considered. When the output register selection flag 331 is "0" and the writing detection circuit 345 detects that the commands are written into the registers A1 to A3, the state of the state machine 320 shifts from the state #1 to the state #3.

Here, even if the processor 100 is interrupted and suspends the processing, for example, and the content executed by the calculation processing unit 380 is not determined, the data transfer unit 370 can proceed the processing. Accordingly, as long as only the register A1 is executable, the processing of the data transfer unit 370 is executable even if the registers A2 and A3 are not executable. In this case, by detecting that "1" is written into the executable register of the register A1, the state of the state machine 320 shifts from the state #1 to the state #3.

At this time, since the output register selection flag 331 is "0", the state machine 320 in the shifted state #3 controls the selector 313 and feeds the command of the DMA_D processing 1-1 of the content of the register A1 to the data transfer unit 370. When the state of the state machine 320 is the state #3, the data transfer unit 370 is set not to write back from the exclusive memory 390 to the shared memory 200. In addition, the calculation processing unit 380 is set not to perform the calculation.

The data transfer unit 370 receives the command of the register A1 and executes the processing of the DMA_D processing 1-1. Thereafter the data transfer unit 370 notifies the state machine 320 of the end of the processing. When the state machine 320 receives the notification of the end of the processing of the DMA_D processing 1-1, the state machine 320 controls the selector 313 to cause the register A1 to be selected. The selector 313 feeds the command of the DMA_D processing 2-1 written into the register A1 to the data transfer unit 370. The data transfer unit 370 executes the processing of the DMA_D processing 2-1. Thereafter the data transfer unit 370 notifies the state machine 320 of the end of the processing.

As to the DMA_D processing 3-1, similar processing is performed. When the state machine 320 receives the notification of the end of the processing from the data transfer unit 370, the state of the state machine 320 shifts to the state #5.

Since the output register selection flag 331 is "0", the state machine 320 in the shifted state #5 controls the selector 313 and feeds the command of the CALC processing 1-1 of the content of the register A2 to the calculation processing unit 380. When the state of the state machine 320 is the state #5, the data transfer unit 370 is set not to operate.

The calculation processing unit 380 executes the processing of the CALC processing 1-1. Thereafter the calculation processing unit 380 notifies the state machine 320 of the end of the processing. When the state machine 320 receives the notification of the end of the processing of the CALC processing 1-1, the state machine 320 controls the selector 313 to cause the register A2 to be selected. The selector 313 feeds the command of the CALC processing 2-1 written into the register A2 to the calculation processing unit 380.

The calculation processing unit 380 executes the processing of the CALC processing 2-1. Thereafter the calculation processing unit 380 notifies the state machine 320 of the end of the processing. When the state machine 320 receives the notification of the end of the processing of the CALC processing 2-1, the state of the state machine 320 shifts to the state #6.

At this time, since the output register selection flag 331 is "0", the state machine 320 in the shifted state #6 controls the selector 313 to cause the register A3 to be selected. The selector 313 feeds the command of the DMA U processing 1-1 written into the register A3 to the data transfer unit 370. In the state #6, the data transfer unit 370 is set not to write into from the shared memory 200 to the exclusive memory 390. In addition, the calculation processing unit 380 is set not to perform the calculation.

The data transfer unit 370 executes the processing of the DMA U processing 1-1. Thereafter the data transfer unit 370 notifies the state machine 320 of the end of the processing. When the state machine 320 receives the notification of the end of the processing of the DMA U processing 1-1, the state machine 320 controls the selector 313 to cause the register A3 to be selected. The selector 313 feeds the command of the DMA U processing 2-1 written into the register A3 to the data transfer unit 370. The data transfer unit 370 executes the processing of the DMA U processing 2-1. Thereafter the data transfer unit 370 notifies the state machine 320 of the end of the processing.

When the state machine 320 receives the notification of the end of the DMA U processing 2-1, the state machine 320 rewrites the executable register to "0", notifies the processor 100 of the end of a series of processing of the command column 1, and shifts to the state #1. In addition, the output register selection flag 331 shifts from "0" to "1".

The state machine 320 shifted to the state #1 has the output register selection flag 331 of "1", therefore detects that the executable register included in the register B1 is "1", and shifts to the state #3. Then, by the similar method, the commands of the command column 2 held in the registers B1 to B3 are fed to the data transfer unit 370 and the calculation processing unit 380.

When the processor 100 receives the end of a series of processing of the command columns, the processor 100 writes the new command column 3 into the register group 312. At this time, since the input register selection flag 332 shows "0", the register group 312 writes new commands from the processor 100 into the registers A1 to A3 by the switch 311. Then, when all processing stored in the last register B3 of the command column 3 is ended, the output register selection flag 331 shifts from "1" to "0" again.

In this way, the commands fed from the processor 100 are successively executed. Respective commands of the command column 1 are held in the registers A1 to A3. Respective command of the command column 2 are held in the registers B1 to B3. In a case where there is no new command, the state machine 320 continues to wait a new command in the state #1.

Thus, in the first embodiment, the state machine 320 shifts the state in accordance with the predetermined number of commands corresponding to the command columns and each unit is operated in accordance with the state. In this manner, with a simple configuration, a data transfer efficiency between the shared memory 200 that stores the address space of the processor 100 and the exclusive memory 390 of the coprocessor 300 can be improved. In addition, the registers used for the respective command columns are switched by selecting the registers A1 to 3 or the B1 to B3, to thereby writing and reading-out into/from the respective command columns into the registers in a parallel way.

2. Second Embodiment

In the above-described first embodiment, an example that the state of the coprocessor 300 is controlled by one state machine 320 has been described. Instead, in the second embodiment, an example that the state of the coprocessor 300 is controlled by two state machines will be described. Specifically, in the second embodiment, different state machines are allocated corresponding to different command columns and each state machine manages a state specific to each command column. Note that as the whole configuration of the information processing system is similar to that in the above-described first embodiment, detailed description thereof will be omitted.

[Information Processing System Configuration]

Figure 7:
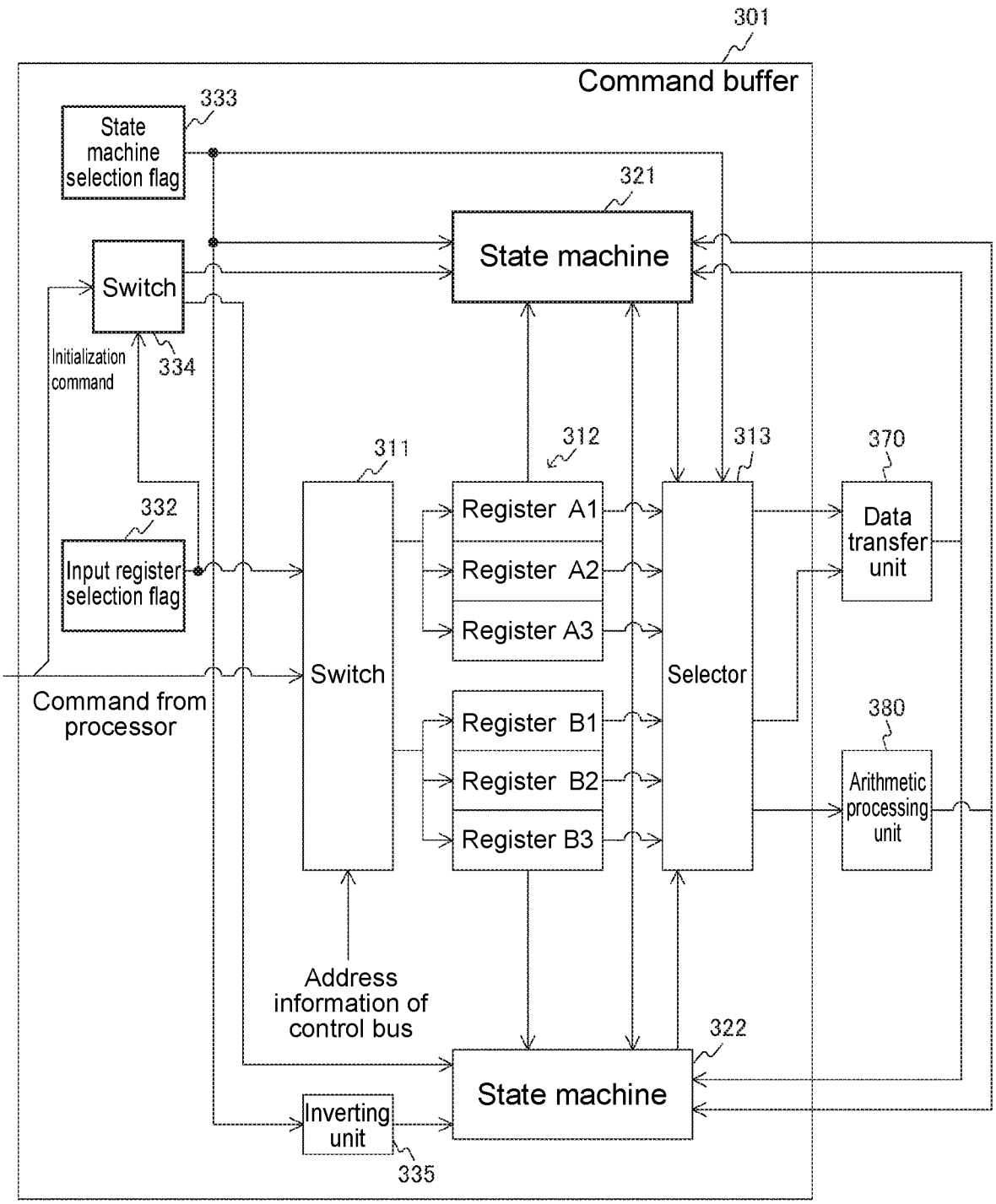
FIG. 7 is a diagram showing a configuration example of the command buffer 301 in the second embodiment of the present technology.

FIG. 7 is a diagram showing a configuration example of the command buffer 301 in the second embodiment of the present technology. The command buffer 301 in the second embodiment is similar to that in the above-described first embodiment in that the register group 312, the switch 311, the selector 313, the input register selection flag 332, and the switch 334 are included. On the other hand, the command buffer 301 in the second embodiment includes two state machines 321 and 322 instead of the state machine 320. In addition, the command buffer 301 in the second embodiment further includes a state machine selection flag 333, a switch 334, and an inverting unit 335.

The state machines 321 and 322 are state machines that manage the states of the processing in the data transfer unit 370 and the calculation processing unit 380 for each command column. For example, the state machine 321 manages the state of the command column 1, and the state machine 322 manages the state of the following command column 2.

The state machine selection flag 333 is a flag for selecting any of the state machines 321 and 322. A value of the state machine selection flag 333 is fed to the state machines 321, 322 and the selector 313.

When the state machine selection flag 333 shows "0", processing is performed in accordance with the state managed by the state machine 321. On the other hand, when the state machine selection flag 333 shows "1", processing is performed in accordance with the state managed by the state machine 322.

The register group 312 is initialized before a new command column is written. Therefore, an initialization instruction of the register is fed to the state machine 321 or 322 via the switch 334. The switch 334 is a switch for distributing the initialization instruction to any of the state machine 321 and 322. The switch 334 decides to input the initialization instruction into either the registers A1 to A3 or B1 to B3 in accordance with the input register selection flag 332.

The inverting unit 335 is a circuit that inverts a value of the state machine selection flag 333. Thus, values opposed to each other are to be fed to the state machine 321 and 322 from the state machine selection flag 333.

The switches 334 and 311 are controlled in accordance with a value of the input register selection flag 332. Specifically, when the input register selection flag 332 shows "0", the switch 311 writes the commands into the registers A1 to A3. In addition, at this time, the switch 334 feeds an initialization signal from the processor 100 to the state machine 321. On the other hand, when the input register selection flag 332 shows "1", the switch 311 writes the commands into the registers B1 to B3. In addition, at this time, the switch 334 feeds the initialization signal from the processor 100 to the state machine 322.

Figure 8:
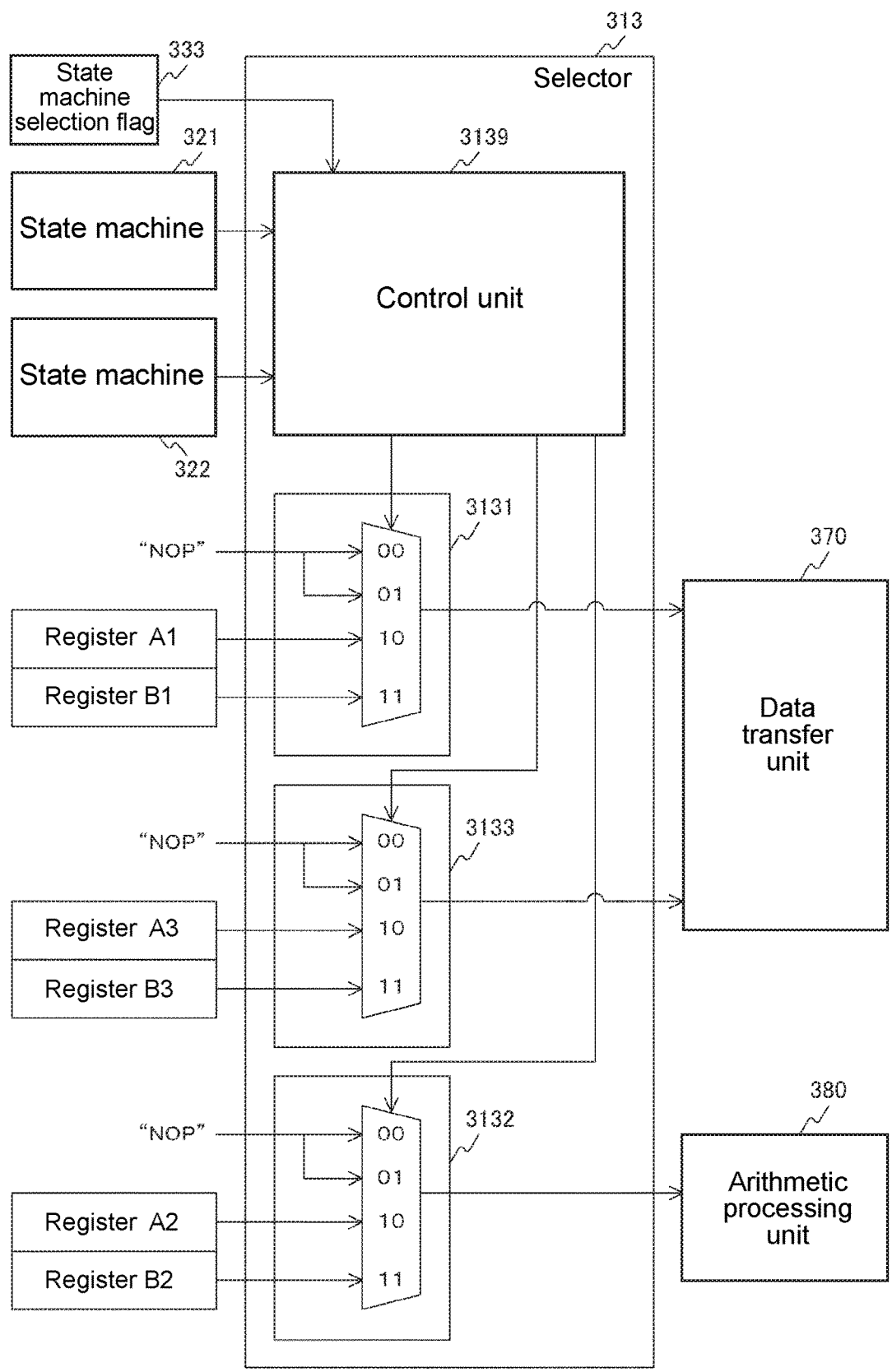
FIG. 8 is a diagram showing a configuration example of the selector 313 in the second embodiment of the present technology.

FIG. 8 is a diagram showing a configuration example of the selector 313 in the second embodiment of the present technology. The selector 313 includes a control unit 3139 and selectors 3131, 3132, and 3133.

The control unit 3139 feeds a selection signal to the selectors 3131 to 3133. The control unit 3139 selects the state managed by the state machine 321 or 322 in accordance with the value of the state machine selection flag 333 and outputs the values of the registers A1 to A3 or B1 to B3 depending on the state. In a case where the state of the selected machine of the state machine 321 and 322 shows the state #3, any of the registers A1 and B1 is selected by the selector 3131 and is fed to the data transfer unit 370. In a case where the state shows the state #5, any of the registers A2 and B2 is selected by the selector 3132 and is fed to the calculation processing unit 380. In a case where the state shows the state #6, any of registers A3 and B3 is selected by the selector 3133 and is fed to the data transfer unit 370.

However, in a case where no command to be fed to the data transfer unit 370 or the calculation processing unit 380, "NOP" that represents no operation is selected.

Figure 9:
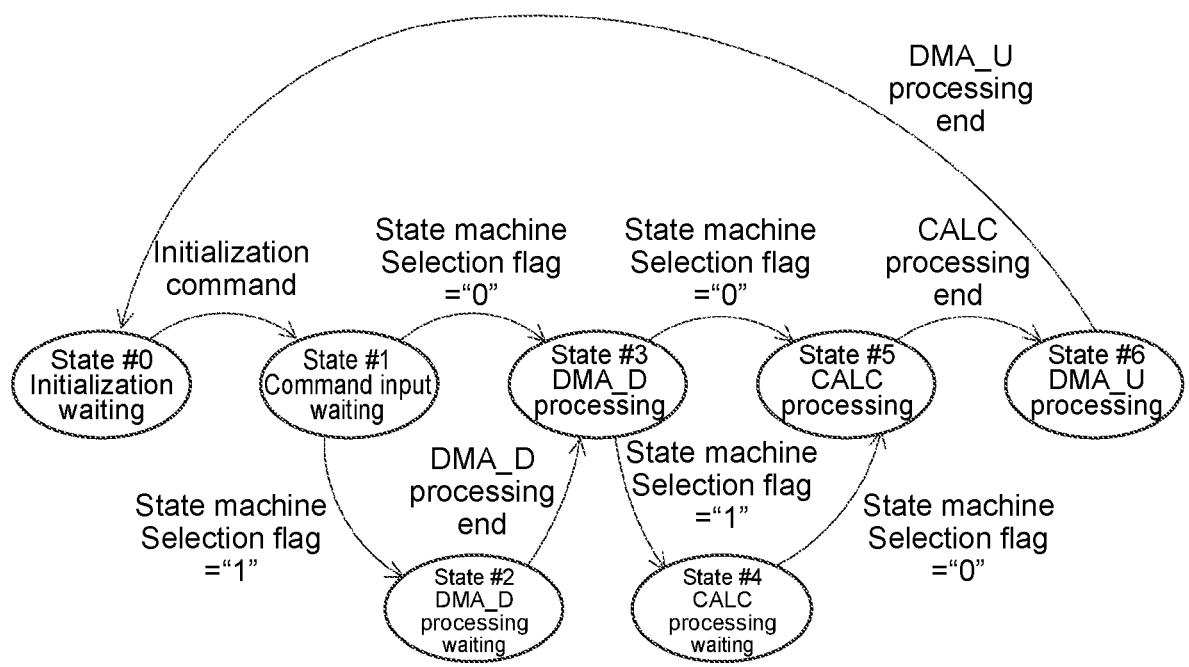
FIG. 9 is a diagram showing a shift example in the state managed by the state machine 321 in the second embodiment of the present technology.
Figure 10:
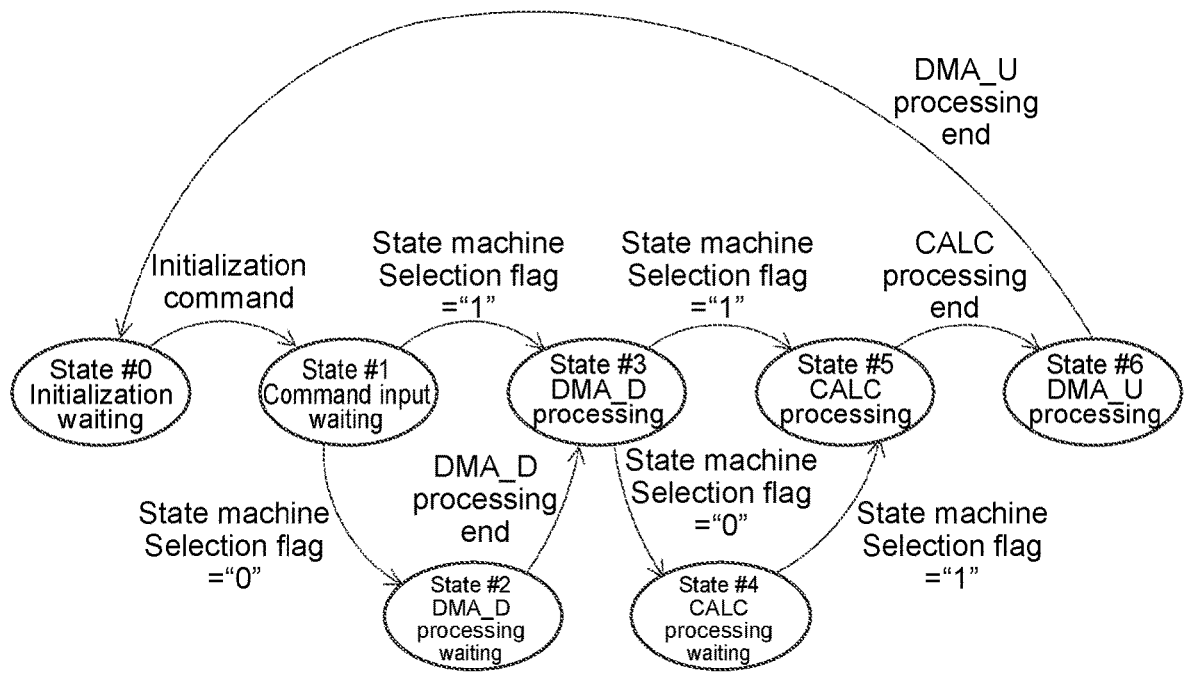
FIG. 10 is a diagram showing a shift example in the state managed by the state machine 322 in the second embodiment of the present technology.

FIG. 9 is a diagram showing a shift example in the state managed by the state machine 321 in the second embodiment of the present technology. FIG. 10 is a diagram showing a shift example in the state managed by the state machine 322 in the second embodiment of the present technology. These states are any of seven states; states #0, #2, and #4 in addition to the states #1, #3, #5, and #6 in the first embodiment.

The state #0 is a state of waiting the initialization instruction. In the state #0, when the initialization instruction is inputted from the processor 100, it shifts to the next state #1.

The state #1 is a state that the register group 312 holds no commands and it waits for the command to be inputted from the processor 100. In the state #1, when the command is inputted from the processor 100, it shifts to the next state #3 as long as an own state machine is selected by the state machine selection flag 333. Specifically, it shifts to the state #3, in a case where the state machine selection flag 333 shows "0" in the state machine 321, and in a case where the state machine selection flag 333 shows "1" in the state machine 322.

On the other hand, in the state #1, when the command is inputted from the processor 100, it shifts to the state #2 as long as the own state machine is not selected by the state machine selection flag 333. Specifically, it shifts to the state #2, in a case where the state machine selection flag 333 shows "1" in the state machine 321, and in a case where the state machine selection flag 333 shows "0" in the state machine 322.

The state #2 is a state that the data transfer unit 370 waits for the end of DMA transferring (DMA_D processing) the data items from the shared memory 200 to the exclusive memory 390. Since the other of the state machines 321 and 322 has the state #3 and performs the DMA_D processing, waiting occurs in order to collide in the data transfer unit 370. In the state #2, when the other ends the DMA_D processing, it shifts to the state #3.

The state #3 is a state that the data transfer unit 370 is DMA transferring (DMA_D processing) the data items from the shared memory 200 to the exclusive memory 390. In the state #3, after the data transfer is ended from the shared memory 200 to the exclusive memory 390, it shifts to the state #5, as long as the own state machine is selected by the state machine selection flag 333. Specifically, it shifts to the state #5, in a case where the state machine selection flag 333 shows "0" in the state machine 321, and in a case where the state machine selection flag 333 shows "1" in the state machine 322.

On the other hand, in the state #3, when the DMA_D processing is ended, it shifts to the state #4 as long as the own state machine is not selected by the state machine selection flag 333. Specifically, it shifts to the state #4, in a case where the state machine selection flag 333 shows "1" in the state machine 321, and in a case where the state machine selection flag 333 shows "0" in the state machine 322.

The state #4 is a state that the calculation processing unit 380 waits for the end of the calculation (CALC processing). Since the other of the state machines 321 and 322 has the state #5 and performs the CALC processing, waiting occurs in order to collide in the processing unit 380. In the state #4, when the other ends the CALC processing, it shifts to the state #5.

The state #5 is a state that the calculation processing unit 380 calculates (CALC processing) the data items transferred to the exclusive memory 390. In the state #5, when the calculation by the calculation processing unit 380 is ended, it shifts to the next state #6.

The state #6 is a state that the data transfer unit 370 DMA transfers (DMA U processing) the data items from the exclusive memory 390 to the shared memory 200. In the state #6, when the transfer of the data items from the exclusive memory 390 to the shared memory 200 is ended, it shifts to the first state #0.

In the state shifts, it controls such that the commands of different command columns are exclusively fed to the data transfer unit 370 and the calculation processing unit 380. In addition, the state machines 321 and 322 manage states specific to respective different command column 1 and command column 2.

Figure 11:
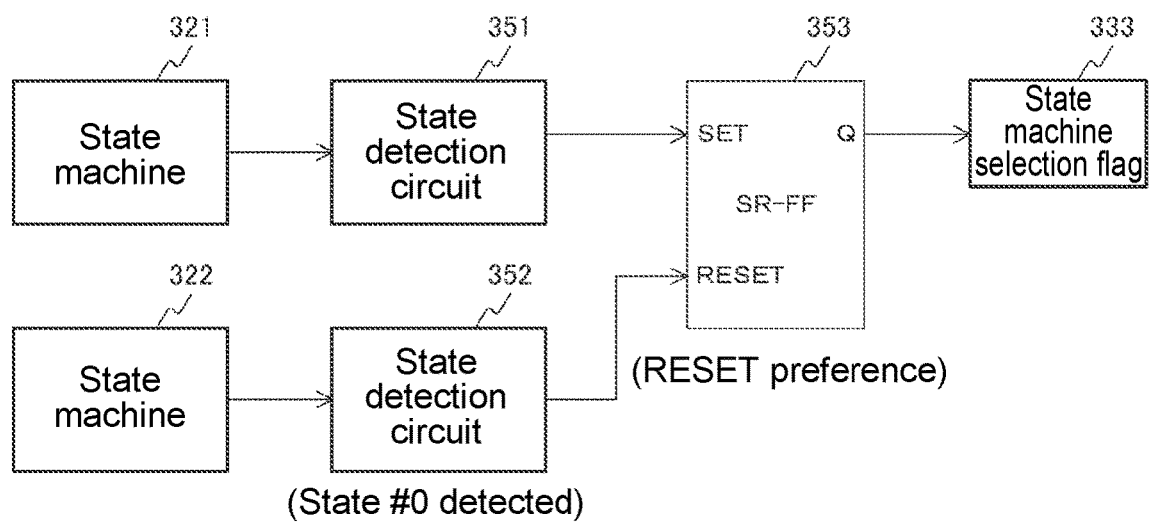
FIG. 11 is a diagram showing an example of control of the state machine selection flag 333 in the second embodiment of the present technology.

FIG. 11 is a diagram showing an example of control of the state machine selection flag 333 in the second embodiment of the present technology. A state detection circuit 351 is a circuit that monitors the state shift in the state machine 321. A state detection circuit 352 is a circuit that monitors the state shift in the state machine 322. An SR flip-flop 353 is flip-flop that holds any of "0" or "1".

When the state detection circuit 351 detects the state #0 in the state machine 321, the state detection circuit 351 outputs a pulse representing a set signal to a set terminal SET of the SR flip-flop 353. With the set signal, the SR flip-flop 353 holds "1".

When the state detection circuit 352 detects the state #0 in the state machine 322, the state detection circuit 352 outputs a pulse representing a reset signal to a reset terminal RESET of the SR flip-flop 353. With the set signal, the SR flip-flop 353 holds "0".

The state machine selection flag 333 holds a value of an output terminal Q of the SR flip-flop 353. Accordingly, the content of the state machine selection flag 333 is to be inverted each time the state of one of the state machines 321 and 322 shifts to the state #0. Specifically, outputting the commands to the data transfer unit 370 and the calculation processing unit 380 from either the registers A1 to A3 or B1 to B3 is changed each time the state of one of the state machines 321 and 322 shifts to the state #0 and is alternately selected.

Note that the control of the input register selection flag 332 is similar to the above-described first embodiment, detailed description thereof will be omitted.

[Information Processing System Operation]

Here, by assuming the above-described command columns, operation of the information processing system will be described. First, the processor 100 writes the commands necessary for the DMA_D processing 1-1 to 3-1 of the command column 1 into the register group 312 via the control bus 101. At this time, initial values of the input register selection flag 332 and the state machine selection flag 333 are "0".

Before the processor 100 feeds the command column 1, the processor 100 issues the initialization instruction to the register group 312. At this time, since the input register selection flag 332 shows "0", the registers A1 to A3 are initialized. In addition, since the state machine selection flag 333 shows "0", the initialization instruction causes the state machine 321 to shift from the state #0 to the state #1 via the switch 334. Note that since the input register selection flag 332 shows "0" and the switch 334 does not feed the initialization signal, the state machine 322 remains to have the state #0 and does not shift.

Subsequently, the processor 100 writes the commands necessary for the DMA_D processing 1-1, 2-1 and 3-1 into the register group 312 via the control bus 101. Since the input register selection flag 332 shows "0", the switch 311 writes the commands into the register A1 in accordance with the address information from the control bus 101.

Next, the processor 100 writes the commands necessary for the CALC processing 1-1 and 2-1 into the register group 312. The switch 311 writes the commands into the register A2.

Further, the processor 100 writes the commands necessary for the DMA U processing 1-1 and 2-1 into the register group 312. The switch 311 selects to write the command into the register A3. When the writing detection circuit 345 detects that the DMA U processing 2-1 is written into the register A3, the input register selection flag 332 becomes "1".

Next, before the processor 100 feeds the command column 2, the processor 100 issues the initialization instruction to the register group 312. At this time, since the input register selection flag 332 shows "1", the registers B1 to B3 are initialized. In addition, since the state machine selection flag 333 shows "1", the initialization instruction causes the state machine 322 to shift from the state #0 to the state #1 via the switch 334.

Furthermore, the processor 100 writes the commands necessary for the DMA_D processing 1-2, 2-2 and 3-2 into the register group 312 via the control bus 101. Since the input register selection flag 332 shows "1", the switch 311 writes the commands into the register B1 in accordance with the address information from the control bus 101.

Next, the processor 100 writes the commands necessary for the CALC processing 1-2 and 2-2 and the DMA U processing 1-2 and 2-2 into the register group 312. The switch 311 writes the commands into the register B2 and B3. When the writing detection circuit 346 detects that the DMA U processing 2-2 is written into the register B3, the input register selection flag 332 is changed from "1" to "0".

Next, operations of the state machines 321 and 322 will be described. Since the state machine selection flag 333 shows "0", the state machine 321 shifts from the state #1 to the state 3 when the commands are written into the registers A1 to A3. Since an inverted signal of the state machine selection flag 333 is inputted to the state machine 322 via the inverting unit 335, the state machine 322 shifts from the state #1 to the state #2 when the commands are written into the registers B1 to B3.

When the state machine selection flag 333 shows "0" and the state machine 321 reaches the state #3, "10" is fed to the selector 3131 and the command of the register A1 is fed to the data transfer unit 370. Then, processing of the DMA_D processing 1-1, 2-1 and 3-1 are sequentially performed. In addition, "00" is fed to the selectors 3132 and 3133, which performs a writing operation from the exclusive memory 390 of the data transfer unit 370 to the shared memory 200. At this time, the calculation processing unit 380 is notified of "NOP" and no processing is therefore performed.

Thereafter, the state machine 321 that receives end notification of the DMA_D processing 3-1 from the data transfer unit 370 shifts to the state #5. Here, the state machine 322 detects that the state machine 321 shifts to the state #5, i.e., the DMA_D processing administered by the state machine 321 is ended, and the state shifts from the state #2 to the state #3. As a result, "11" is fed to the selector 3131 and the content of the register B1 is fed to the data transfer unit 370. In addition, "10" is fed to the selector 3132 and the content of the register A2 is fed to the calculation processing unit 380. In addition, "00" is fed to the selector 3133, which will be "NOP".

The commands necessary for the CALC processing 1-1 and 2-1 stored in the register A2 are fed to the calculation processing unit 380 The commands necessary for the DMA_D processing 1-2, 2-2 and 3-2 stored in the register B1 are fed to the data transfer unit 370. Thus, the DMA_D processing 1-2, 2-2 and 3-2 and the CALC processing 1-1 and 2-1 are processed in a parallel way.

After the DMA_D processing 1-2, 2-2 and 3-2 are ended, the state machine 322 shifts from the state #3 to the state #4. When the state machine 321 is notified of the end of the CALC processing 1-1 and 2-1 from the calculation processing unit 380, the state machine 321 shifts to the state #6. When the state machine 321 shifts to the state #6, "00" is fed to the selector 3132, which will be "NOP". "10" is fed to the selector 3133, the commands necessary for the DMA U processing 1-1 and 2-1 stored in the register A3 are fed to the data transfer unit 370. When the state machine 322 shifts to the state #4, "00" is fed to the selector 3131, which will be "NOP".

When the notification of the end of the DMA U processing 2-1 is received from the data transfer unit 370, the state machine 321 shifts to the state #0, notifies the processor 100 of the end of a series of calculation, and causes the state machine selection flag 333 to shift from "0" to "1". Since the state #0 waits the initialization of the register, rewriting of execution permission flags of the registers A1 to A3 is unnecessary unlike in the first embodiment.

When the processor 100 receives the notification of the end of a series of processing, a next command is written into the register group 312 at a proper time. At this time, since the input register selection flag 332 is "0", the command will be written into the registers A1 to A3. Since the state machine selection flag 333 becomes "1" and the flag inputted to the state machine 322 becomes "0", the state machine 322 thereby shifts from the state #4 to the state #5. Since the state machine selection flag 333 becomes "1" and the state machine 322 has the state #5, "11" is fed to the selector 3132 and the commands of the CALC processing 1-2 and 2-2 stored in the register B2 will be fed to the calculation processing unit 380.

If the next processing has been written into the processor 100, "10" is fed to the selector 3131 and the command newly written into the register A1 is fed to the data transfer unit 370. "00" is fed to the selector 3133, which will be "NOP". Thereafter, the state machine 322 shifts the state and feeds the commands of the DMA U processing 1-2 and 2-2 to the data transfer unit 370.

Figure 12:
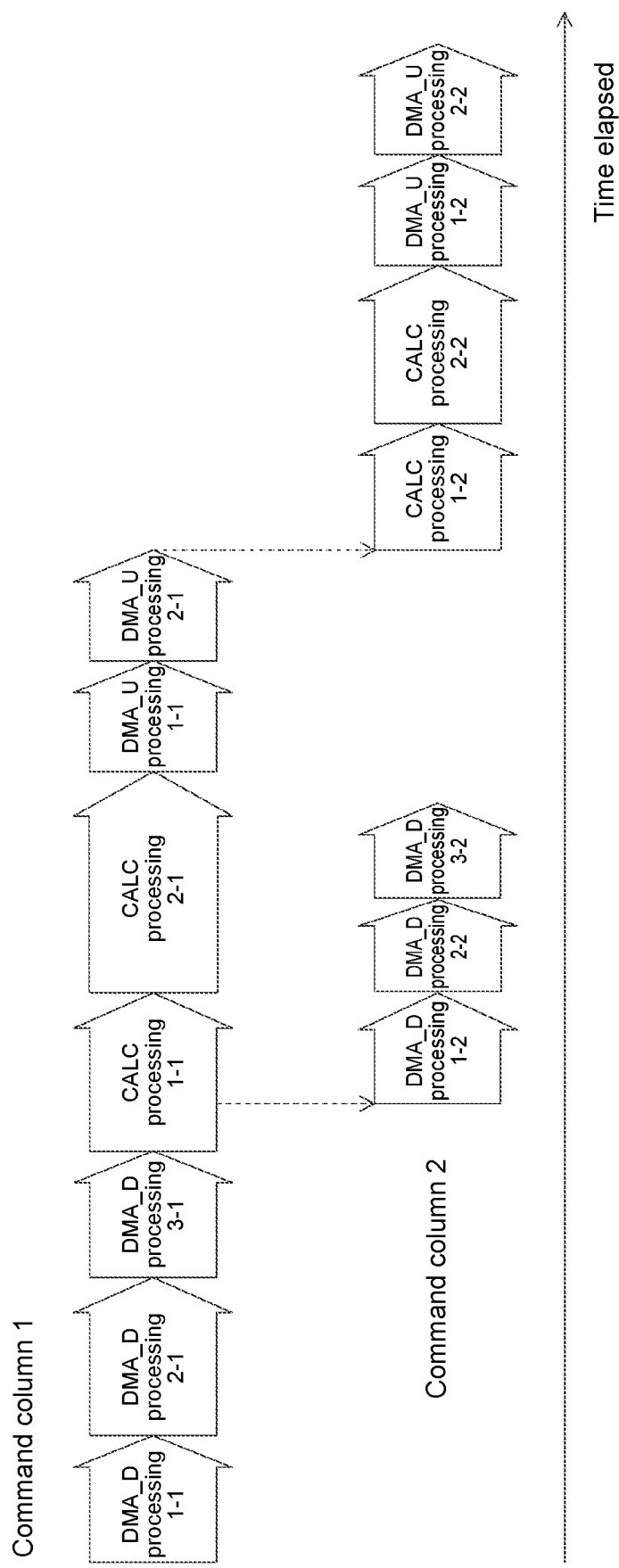
FIG. 12 is a diagram showing an example of an operation timing in the second embodiment of the present technology.

FIG. 12 is a diagram showing an example of an operation timing in the second embodiment of the present technology. This example shows the case that processing times of the DMA_D processing 1-2, 2-2, and 3-2 are shorter than processing times of the CALC processing 1-1 and 2-1.

In a case where the processing times of the DMA_D processing 1-2, 2-2 and 3-2 are shorter than the processing times of the CALC processing 1-1 and 2-1, the DMA U processing 1-1 and 2-1 is executed after the CALC processing 2-1. Therefore, no conflict occurs in the data transfer unit 370.

Figure 13:
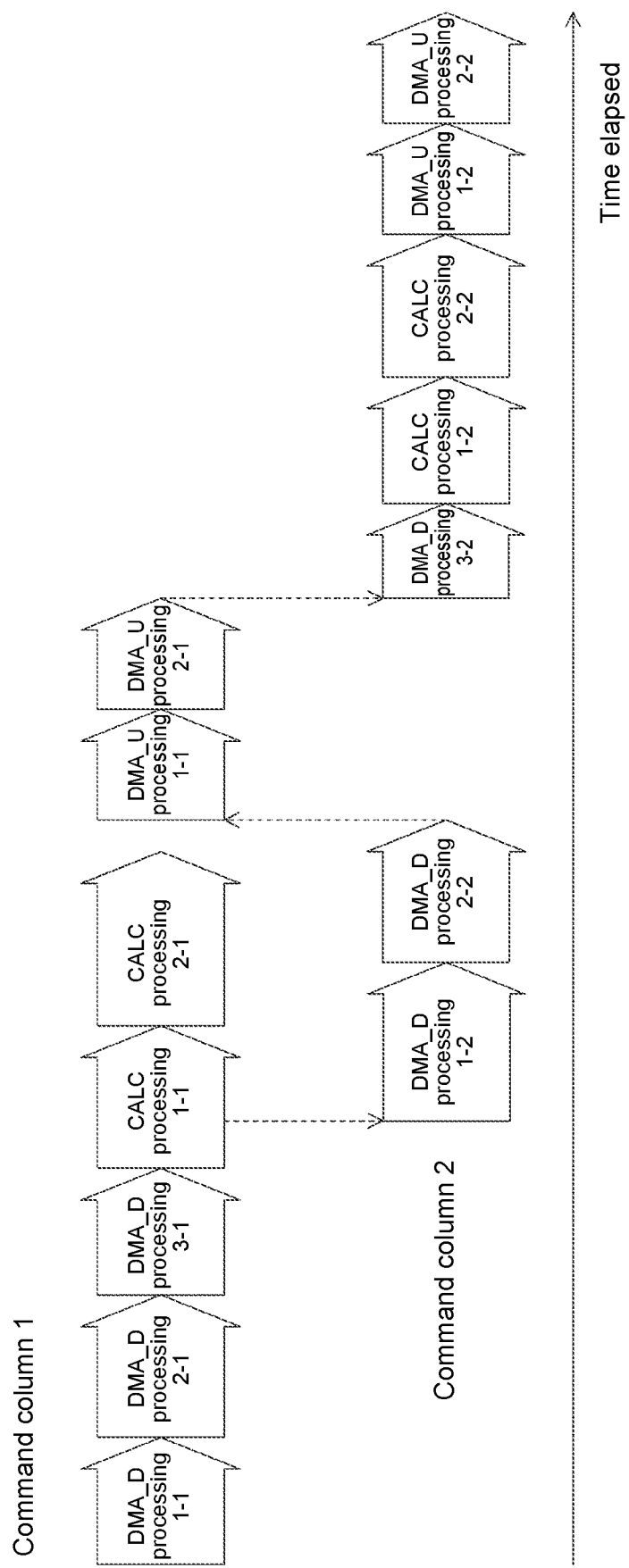
FIG. 13 is a diagram showing other example of the operation timing in the second embodiment of the present technology.

FIG. 13 is a diagram showing other example of the operation timing in the second embodiment of the present technology. This example shows the case that the processing times of the CALC processing 1-1 and 2-1 are shorter than the processing times of the DMA_D processing 1-2, 2-2, and 3-2.

In a case where the processing times of the CALC processing 1-1 and 2-1 are shorter than the processing times of the DMA_D processing 1-2, 2-2 and 3-2, the DMA U processing 1-1 and 2-1 and the DMA_D processing 1-2, 2-2 and 3-2 are processed at the same time. In this case, the data transfer unit 370 has an arbitration function of reading-out and writing-in the data items as a normal function of the DMA to control such that the DMA_D processing 3-2 is executed later.

Thus, in the second embodiment, the state of each command column is managed by the two state machines 321 and 322. In this manner, the CALC processing of the former command column in the calculation processing unit 380 and the DMA_D processing of the latter command column in the data transfer unit 370 can be executed in parallel in the command columns.

3. Third Embodiment

In the above-described second embodiment, when the state machine selection flag that is inputted into the own becomes "0", the CALC processing 1-2 to 2-2 is started. In contrast, if the data items to be transferred in the DMA U processing 1-1 to 2-1 are not overwritten in the next CALC processing 1-2 to 2-2, the DMA U processing 1-1 to 2-1 and the CALC processing 1-2 to 2-2 can be executed in parallel. Therefore, in the third embodiment, by executing these in parallel, efficiency of the processing in the calculation processing unit 380 is further improved.

Note that the information processing system configuration is similar to that of the above-described second embodiment, detailed description thereof will be omitted.

Figure 14:
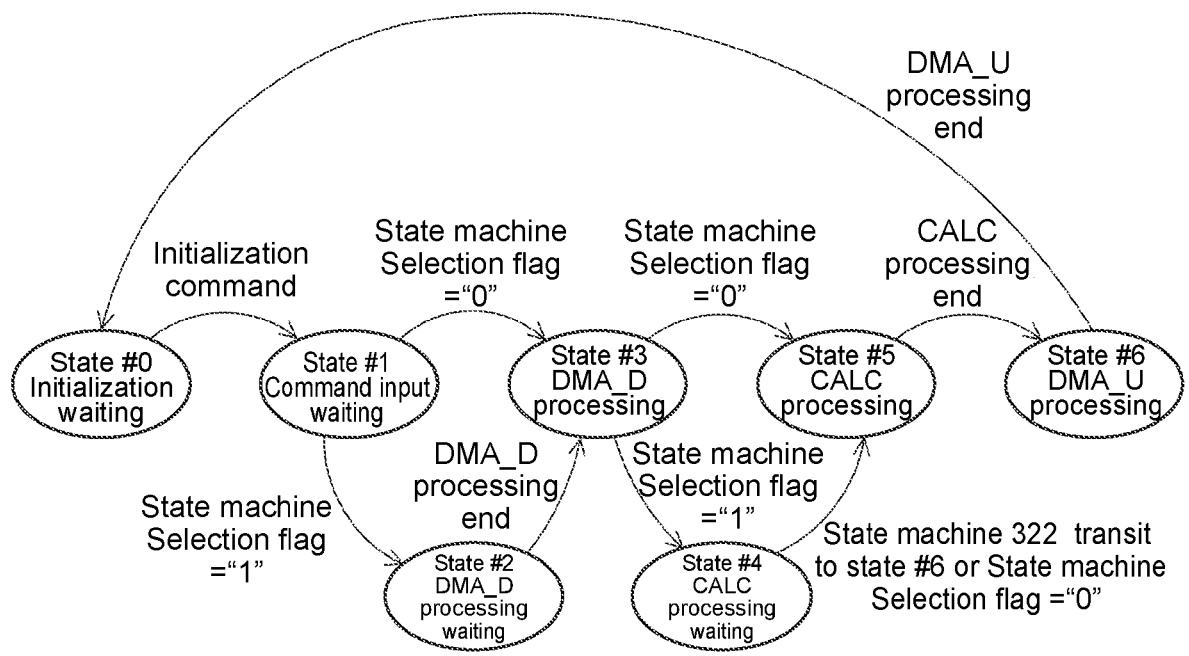
FIG. 14 is a diagram showing a shift example in the state managed by the state machine 321 in the third embodiment of the present technology.
Figure 15:
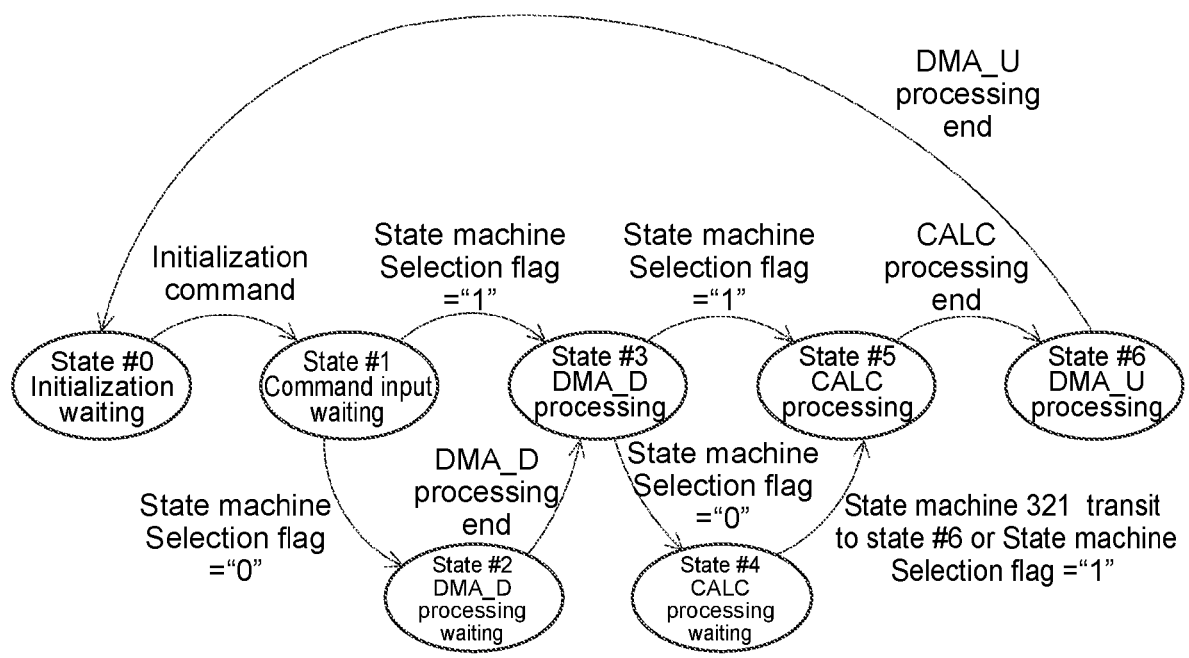
FIG. 15 is a diagram showing a shift example in the state managed by the state machine 322 in the third embodiment of the present technology.

FIG. 14 is a diagram showing a shift example in the state managed by the state machine 321 in the third embodiment of the present technology. FIG. 15 is a diagram showing a shift example in the state managed by the state machine 322 in the third embodiment of the present technology. The shift examples in the third embodiment have shift conditions from the state #4 to the state #5 different from that in the second embodiment.

In a case where the state machine selection flag 333 shows "0", the state machine 321 shifts from the state #5 to the state #6, and the state machine 322 has the state #4, the state machine shifts to the state #5. As a result, "00" is fed to the selector 3131, "11" is fed to the selector 3132, and the commands of the CALC processing 1-2 and 2-2 written into the register B2 are successively feed to the calculation processing unit 380. In addition, "10" is fed to the selector 3133 and the commands of the DMA U processing 1-1 and 2-1 written into the data transfer unit 370 are successively fed to the data transfer unit 370.

In this case, a parallel operation of a data transfer from the exclusive memory 390 to the shared memory 200 and the calculation processing unit 380 is possible in addition to a parallel operation of the above-described data transfer from the shared memory 200 to the exclusive memory 390 and the calculation processing unit 380.

With the state shifts, it controls so that the commands in the different command columns are exclusively fed to the data transfer unit 370 and the calculation processing unit 380. In addition, the state machines 321 and 322 manage the states specific to the respective different command column 1 and command column 2.

Furthermore, in the third embodiment, the state machines 321 and 322 shift the states in accordance with the predetermined number of commands corresponding to the command columns. Also, the state machines 321 and 322 shift the states taking the states of other command columns into consideration similar to the shift from the state #4 to the state #5.

Figure 16:
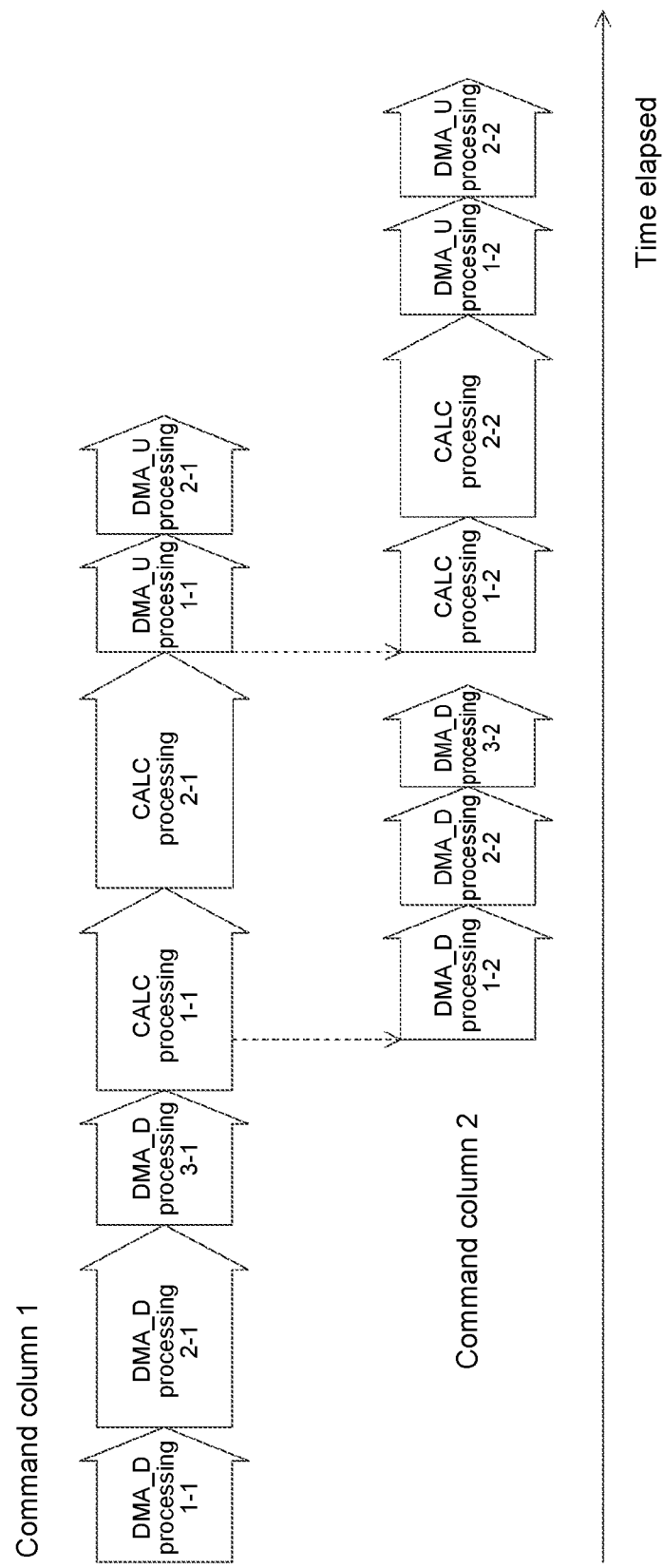
FIG. 16 is a diagram showing an example of an operation timing in the third embodiment of the present technology.

FIG. 16 is a diagram showing an example of an operation timing in the third embodiment of the present technology. This example shows the case that the processing times of the CALC processing 1-1 and 2-1 are longer than the processing times of the DMA_D processing 1-2, 2-2, and 3-2.

In this case, dissimilar to the second embodiment, it reveals that processing of the DMA U processing 1-1 and 2-1 and the CALC processing 1-2 and 2-2 are executed in parallel.

Figure 17:
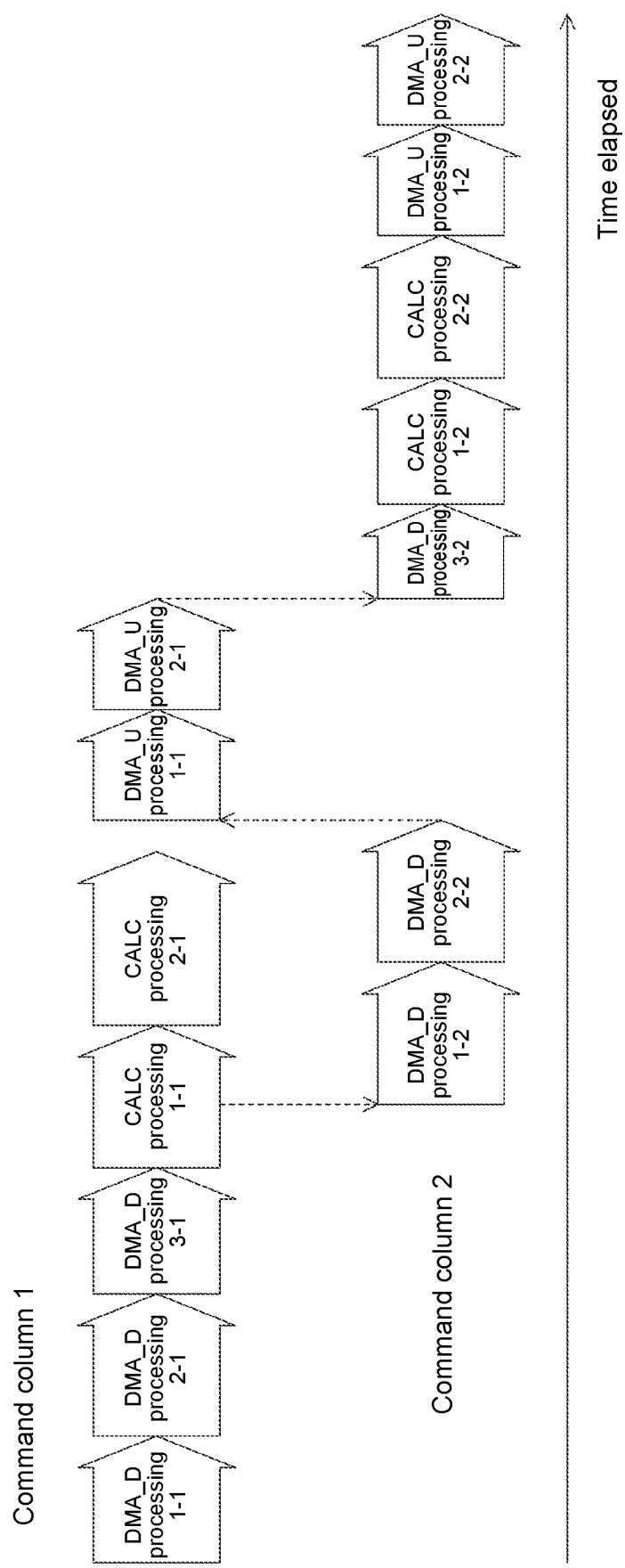
FIG. 17 is a diagram showing other example of the operation timing in the third embodiment of the present technology.

FIG. 17 is a diagram showing other example of the operation timing in the third embodiment of the present technology. This example shows the case that the processing times of the CALC processing 1-1 and 2-1 are shorter than the processing times of the DMA_D processing 1-2, 2-2, and 3-2.

In this case, a conflict occurs between the DMA U processing 1-1 and 2-1 and the DMA_D processing 1-2, 2-2, and 3-2 in the data transfer unit 370. Therefore, similar to the second embodiment, it controls to execute the DMA_D processing 3-2 thereafter.

Thus, in the third embodiment, at the end of the CALC processing of the former command column, it causes the state of the latter command column to be shifted. In this manner, the DMA U processing of the former command column in the data transfer unit 370 and the CALC processing of the latter command column in the calculation processing unit 380 can be executed in parallel in the command columns.

Note that as the registers inside storing a series of commands of the command buffer 301, two routes of the registers A1 to A3 and B1 to B3 have been described as an example. However, three or more routes of the registers may be arranged.

In addition, it has been described that the registers A1 and B1 have the FIFO function of storing processing instructions three times on the data transfer unit 370, the registers A2 and B2 have the FIFO function of storing processing instructions two times on the calculation processing unit 380, and the registers A3 and B3 have the FIFO function of storing processing instructions two times on the data transfer unit 370. However, the number of storing the processing instructions (number of stages of FIFO) may be increased in the respective register.

Furthermore, the data transfer unit 370 and the calculation processing unit 380 have been described as an example in the above-described embodiments. A plurality of the calculation processing units 380 may be arranged. In this case, it is also possible to arrange a plurality of the data transfer units 370 for the plurality of the calculation processing units 380.

Note that the above-described embodiments show examples to specify the present technology and respective matters in the embodiments and respective matters used to specify the invention in claims have a correspondence relationship. Similarly, respective matters used to specify the invention in claims and respective matters having the same designation in the embodiment of the present technology have a correspondence relationship. The present technology are not limited to the embodiments. Various modifications and alterations may be made on the embodiments without departing from the spirit thereof.

In addition, processing procedures described in the above-described embodiments may be considered as method including a series of procedures or may be considered as programs or a recording medium that storing the programs. As the recording medium, a CD (Compact Disc), an MD (MiniDisc), a DVD (Digital Versatile Disc), a memory card, Blu-ray (registered trademark) Disc, and the like can be used, for example.

It should be noted that the effects described in the present specification are merely illustrative and are not limitative, and may have an additive effect.

The present technology may also have the following structures.

(1) A calculation processing apparatus, including:

an exclusive memory storing an exclusive area different from an address space of a processor;

a data transfer unit performing transfer processing of data items between the address space and the exclusive memory;

a calculation processing unit performing calculation processing between the data items stored in the exclusive memory;

a command register group holding each command of command columns received from the processor in each register;

a state machine managing a state of processing in the data transfer unit and the calculation processing unit; and a control unit controlling the command register group so as to hold the command and controlling the command register group such that the commands held by the command register group are fed to any of the data transfer unit and the calculation processing unit depending on the state.

(2) The calculation processing apparatus according to (1), in which the state machine causes the state to be shifted in accordance with a predetermined number of commands corresponding to the command columns to manage the state.

(3) The calculation processing apparatus according to (1) or (2), in which the command column includes a command of performing first data transfer processing of transferring the data items from the address space to the exclusive memory, a command of performing calculation processing between the data items stored in the exclusive memory, and a command of performing second data transfer processing of transferring the data items from the exclusive memory to the address space, the state machine causes the state to shift to a state of allowing execution of the command of performing the first data transfer processing when the command of performing the first data transfer processing is inputted, causes the state to shift to a state of allowing execution of the command of performing the calculation processing when a time necessary to execute the command of performing the first data transfer processing elapses, and causes the state to shift a state of allowing execution of the command of performing the second data transfer processing when a time necessary to execute the command of performing the calculation processing elapses.

(4) The calculation processing apparatus according to any one of (1) to (3), in which the command register group includes a plurality of sub-register groups, and the control unit controls such that the different command columns are held by the respective plurality of sub-register groups when the plurality of the command columns is received from the processor.

(5) The calculation processing apparatus according to (4), in which the control unit controls such that the commands of the different command columns are exclusively fed to the data transfer unit and the calculation processing unit.

(6) The calculation processing apparatus according to (4) or (5), in which the state machine manages the states specific to the respective different command columns.

(7) The calculation processing apparatus according to (4) or (5), in which the state machine shifts the state of one of the plurality of command columns in accordance with the predetermined number of commands corresponding to the one of the plurality of command columns when the states of the plurality of command columns are managed and in accordance with the states of other command columns.

(8) The calculation processing apparatus according to (4) or (5), in which each of the plurality of command columns includes a command of performing first data transfer processing of transferring the data items from the address space to the exclusive memory, a command of performing calculation processing between the data items stored in the exclusive memory, and a command of performing second data transfer processing of transferring the data items from the exclusive memory to the address space, the state machine causes the state to shift a state of allowing execution of the command of performing the first data transfer processing on a command column to be second processed of the plurality of the command columns when the time necessary to execute the command of performing the first data transfer processing of a command column to be first processed of the plurality of the command columns elapses, causes the state to shift a state of allowing execution of a command of performing the calculation processing on the command column to be second processed of the plurality of the command columns when the time necessary to execute the command of performing the calculation processing of the command column to be first processed elapses, and causes the state to shift a state of allowing execution of a command of performing the second data transfer processing on the command column to be first processed when the time necessary to execute the command of performing the calculation processing of the command column to be first processed elapses.

(9) The calculation processing apparatus according to (8), in which the state machine causes the state to shift a state of allowing execution of the command of performing the calculation processing on the command column to be second processed when the time necessary to execute the command of performing the calculation processing of the command column to be first processed elapses or when the state is shifted to the state that the command of performing the calculation processing on the command column to be first processed is ended.

(10) An information processing system, including: a processor; a calculation processing apparatus; and a shared memory storing an address space of the processor and being accessible even from the calculation processing apparatus, the calculation processing apparatus including an exclusive memory storing an exclusive area different from an address space of a processor, a data transfer unit performing transfer processing of data items between the address space and the exclusive memory, a calculation processing unit performing calculation processing between the data items stored in the exclusive memory, a command register group holding each command of command columns received from the processor in each register, a state machine managing a state of processing in the data transfer unit and the calculation processing unit, and a control unit controlling the command register group so as to hold the command and controlling the command register group such that the commands held by the command register group are fed to any of the data transfer unit and the calculation processing unit depending on the state.

REFERENCE SIGNS LIST

- 100 processor
- 101 control bus
- 102 memory bus
- 200 shared memory
- 300 coprocessor
- 301 command buffer
- 310 command holding unit
- 311 switch
- 312 register group
- 313 selector
- 320 to 322 state machine
- 330 control unit
- 331 output register selection flag
- 332 input register selection flag
- 333 state machine selection flag
- 334 switch
- 335 inverting unit
- 341 state detection circuit
- 342 flip-flop
- 343 inverter
- 344 writing monitor circuit
- 345, 346 writing detection circuit
- 347, 353 SR flip-flop
- 351, 352 state detection circuit
- 360 bus interface
- 370 data transfer unit
- 380 calculation processing unit
- 390 exclusive memory
- 3131 to 3133 selector
- 3139 control unit.

The invention claimed is:

1. A calculation processing apparatus, comprising:
an exclusive memory storing an exclusive area different from an address space of a processor that is communicatively coupled to a memory bus and a control bus that is distinct from the memory bus;
a data transfer unit communicatively coupled to the memory bus, the data transfer unit configured to perform transfer processing of data items between the address space and the exclusive memory via the memory bus;
a calculation processing unit configured to perform calculation processing between the data items stored in the exclusive memory;
a command register group including a plurality of registers, a first register of the plurality of registers holding each command of a first command column of a plurality of command columns received from the processor, and a second register of the plurality of registers holding each command of a second command column of the plurality of command columns received from the processor, the second command column is distinct from the first command column;
a state machine configured to manage a state of processing in the data transfer unit and the calculation processing unit; and
a control unit configured to
control the command register group to hold commands, and
control the command register group to feed the commands held by the command register group to any of the data transfer unit and the calculation processing unit depending on the state,
wherein first commands of the first command column are executed in a first stored order,
wherein second commands of the second command column are executed in a second stored order,
wherein one or more of the second commands are executed in parallel to the first commands, and
wherein the state machine is separate and distinct from the data transfer unit, the calculation processing unit, the command register group, the control unit, and the processor.

2. The calculation processing apparatus according to claim 1, wherein
the state machine is further configured to cause the state to be shifted in accordance with a predetermined number of commands corresponding to the plurality of command columns to manage the state.

3. The calculation processing apparatus according to claim 1, wherein
the first command column includes a first command of performing a first data transfer processing of transferring the data items from the address space to the exclusive memory, a second command of performing calculation processing between the data items stored in the exclusive memory, and a third command of performing a second data transfer processing of transferring the data items from the exclusive memory to the address space,
the state machine is further configured to
cause the state to shift to a state of allowing execution of the first command of performing the first data transfer processing when the first command of performing the first data transfer processing is inputted,
cause the state to shift to a state of allowing execution of the second command of performing the calculation processing when a time necessary to execute the first command of performing the first data transfer processing elapses, and
cause the state to shift a state of allowing execution of the third command of performing the second data transfer processing when a time necessary to execute the second command of performing the calculation processing elapses.

4. The calculation processing apparatus according to claim 1, wherein
the command register group includes a plurality of sub-register groups, and
the control unit configured to control the plurality of sub-register groups to hold different command columns when the plurality of command columns is received from the processor.

5. The calculation processing apparatus according to claim 4, wherein
the control unit is configured to control the plurality of sub-register groups to exclusively feed the commands of the different command columns to the data transfer unit and the calculation processing unit.

6. The calculation processing apparatus according to claim 4, wherein
the state machine manages states specific to the respective different command columns.

7. The calculation processing apparatus according to claim 4, wherein
the state machine is further configured to shift the state of one of the plurality of command columns in accordance with a predetermined number of commands corresponding to the one of the plurality of command columns when states of the plurality of command columns are managed and in accordance with states of other command columns.

8. The calculation processing apparatus according to claim 4, wherein each of the plurality of command columns includes a first command of performing a first data transfer processing of transferring the data items from the address space to the exclusive memory, a second command of performing calculation processing on the data items stored in the exclusive memory, and a third command of performing a second data transfer processing of transferring the data items from the exclusive memory to the address space, the state machine is further configured to cause the state to shift a state of allowing execution of the first command of performing the first data transfer processing on the second command column to be second processed of the plurality of command columns when a time necessary to execute the first command of performing the first data transfer processing of the first command column to be first processed of the plurality of command columns elapses, cause the state to shift a state of allowing execution of the second command of performing the calculation processing on the second command column to be second processed of the plurality of command columns when a time necessary to execute the second command of performing the calculation processing of the first command column to be first processed elapses, and cause the state to shift a state of allowing execution of the third command of performing the second data transfer processing on the first command column to be first processed when the time necessary to execute the second command of performing the calculation processing of the first command column to be first processed elapses.

9. The calculation processing apparatus according to claim 8, wherein the state machine causes the state to shift a state of allowing execution of the command of performing the calculation processing on the second command column to be second processed when the time necessary to execute the command of performing the calculation processing of the first command column to be first processed elapses or when the state is shifted to the state that the command of performing the calculation processing on the first command column to be first processed is ended.

10. An information processing system, comprising:

a processor communicatively coupled to a memory bus and a control bus that is distinct from the memory bus;

a calculation processing apparatus communicatively coupled to the memory bus; and a shared memory storing an address space of the processor and being accessible even from the calculation processing apparatus, the shared memory is communicatively coupled to the memory bus, the calculation processing apparatus including an exclusive memory storing an exclusive area different from the address space of the processor, a data transfer unit configured to perform transfer processing of data items between the address space and the exclusive memory via the memory bus, a calculation processing unit configured to perform calculation processing between the data items stored in the exclusive memory, a command register group including a plurality of registers, a first register of the plurality of registers holding each command of a first command column received from the processor, and a second register of the plurality of registers holding each command of a second command column received from the processor, the second command column is distinct from the first command column, a state machine configured to manage a state of processing in the data transfer unit and the calculation processing unit, and a control unit configured to control the command register group to hold commands, and control the command register group to feed the commands held by the command register group to any of the data transfer unit and the calculation processing unit depending on the state, wherein first commands of the first command column are executed in a first stored order, wherein second commands of the second command column are executed in a second stored order, wherein one or more of the second commands are executed in parallel to the first commands, and wherein the state machine is separate and distinct from the data transfer unit, the calculation processing unit, the command register group, the control unit, and the processor.

11. The information processing system according to claim 10, wherein the state machine is further configured to cause the state to be shifted in accordance with a predetermined number of commands corresponding to the plurality of command columns to manage the state.

12. The information processing system according to claim 10, wherein the first command column includes a first command of performing a first data transfer processing of transferring the data items from the address space to the exclusive memory, a second command of performing calculation processing between the data items stored in the exclusive memory, and a third command of performing a second data transfer processing of transferring the data items from the exclusive memory to the address space, the state machine is further configured to cause the state to shift to a state of allowing execution of the first command of performing the first data transfer processing when the first command of performing the first data transfer processing is inputted, cause the state to shift to a state of allowing execution of the second command of performing the calculation processing when a time necessary to execute the first command of performing the first data transfer processing elapses, and cause the state to shift a state of allowing execution of the third command of performing the second data transfer processing when a time necessary to execute the second command of performing the calculation processing elapses.

13. The information processing system according to claim 10, wherein the command register group includes a plurality of sub-register groups, and the control unit configured to control the plurality of sub-register groups to hold different command columns when the plurality of command columns is received from the processor.

14. The information processing system according to claim 13, wherein
the control unit is configured to control the plurality of sub-register groups to exclusively feed the commands of the different command columns to the data transfer unit and the calculation processing unit.

15. The information processing system according to claim 13, wherein
the state machine manages states specific to the respective different command columns.

16. The information processing system according to claim 13, wherein
the state machine is further configured to shift the state of one of the plurality of command columns in accordance with a predetermined number of commands corresponding to the one of the plurality of command columns when states of the plurality of command columns are managed and in accordance with states of other command columns.

17. The information processing system according to claim 13, wherein
each of the plurality of command columns includes a first command of performing a first data transfer processing of transferring the data items from the address space to the exclusive memory, a second command of performing calculation processing on the data items stored in the exclusive memory, and a third command of performing a second data transfer processing of transferring the data items from the exclusive memory to the address space,
the state machine is further configured to
cause the state to shift a state of allowing execution of the first command of performing the first data transfer processing on the second command column to be second processed of the plurality of command columns when a time necessary to execute the first command of performing the first data transfer processing of the first command column to be first processed of the plurality of command columns elapses,
cause the state to shift a state of allowing execution of the second command of performing the calculation processing on the second command column to be second processed of the plurality of command columns when a time necessary to execute the second command of performing the calculation processing of the first command column to be first processed elapses, and
cause the state to shift a state of allowing execution of the third command of performing the second data transfer processing on the first command column to be first processed when the time necessary to execute the second command of performing the calculation processing of the first command column to be first processed elapses.

18. The information processing system according to claim 17, wherein
the state machine causes the state to shift a state of allowing execution of the command of performing the calculation processing on the second command column to be second processed when the time necessary to execute the command of performing the calculation processing of the first command column to be first processed elapses or when the state is shifted to the state that the command of performing the calculation processing on the first command column to be first processed is ended.

19. The calculation processing apparatus according to claim 1, wherein the first stored order is distinct from the second stored order.

20. The calculation processing apparatus according to claim 1, further comprising:
a bus interface configured to interface between the control unit and the processor,
wherein the bus interface is communicatively coupled to at least one of the control bus or the processor.

* * * * *